US 9,491,839 B2

(12) United States Patent
Suzuki et al.

(10) Patent No.: US 9,491,839 B2
(45) Date of Patent: Nov. 8, 2016

(54) DRIVING DEVICE AND DRIVING METHOD FOR DISCHARGE LAMP, LIGHT SOURCE DEVICE, AND PROJECTOR

(71) Applicant: SEIKO EPSON CORPORATION, Tokyo (JP)

(72) Inventors: Junichi Suzuki, Chino-shi (JP); Satoshi Kito, Chino (JP); Norio Imaoka, Takamori-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 113 days.

(21) Appl. No.: 14/016,626

(22) Filed: Sep. 3, 2013

(65) Prior Publication Data

US 2014/0063471 A1    Mar. 6, 2014

(30) Foreign Application Priority Data

Sep. 6, 2012  (JP) ................... 2012-195838
Sep. 10, 2012 (JP) ................... 2012-198164
Sep. 10, 2012 (JP) ................... 2012-198165

(51) Int. Cl.
*G05F 1/52* (2006.01)
*H05B 41/36* (2006.01)
*H05B 41/288* (2006.01)
*H05B 41/292* (2006.01)

(52) U.S. Cl.
CPC .......... *H05B 41/36* (2013.01); *H05B 41/2888* (2013.01); *H05B 41/2928* (2013.01); *Y02B 20/202* (2013.01)

(58) Field of Classification Search
CPC .............................. H05B 41/36; G03B 21/14
USPC .......... 353/85; 315/287, 209 R, 194, 291, 82
See application file for complete search history.

(56) References Cited

U.S. PATENT DOCUMENTS

| 5,932,976 A * | 8/1999 | Maheshwari ........ H05B 41/288 |
| | | 315/174 |
| 6,043,614 A * | 3/2000 | Tessnow et al. .............. 315/291 |
| 7,391,165 B2 * | 6/2008 | Lee et al. ...................... 315/247 |
| 8,269,424 B2 | 9/2012 | Terashima |
| 8,378,581 B2 | 2/2013 | Terashima |

(Continued)

FOREIGN PATENT DOCUMENTS

| JP | A-60-262392 | 12/1985 |
| JP | A-11-45794 | 2/1999 |

(Continued)

*Primary Examiner* — Douglas W Owens
*Assistant Examiner* — Wei Chan
(74) *Attorney, Agent, or Firm* — Oliff PLC

(57) ABSTRACT

A light source device includes a discharge lamp including a pair of electrodes arranged to be opposed to each other in a hollow section in which a discharge medium is encapsulated and a driving device. The driving device includes a supplying unit configured to supply an alternating current having a frequency higher than 1 kHz to the pair of electrodes in a high-frequency period and a control unit configured to set at least a first frequency higher than 1 kHz and a second frequency higher than 1 kHz and different from the first frequency as the frequency of the alternating current, switch an alternating current having the first frequency and an alternating current having the second frequency in the high-frequency period, and control the supplying unit to repeat the high-frequency period to supply an alternating current to the pair of electrodes.

18 Claims, 15 Drawing Sheets

(56) References Cited

U.S. PATENT DOCUMENTS

| | | |
|---|---|---|
| 8,400,068 B2 | 3/2013 | Terashima |
| 2003/0020416 A1* | 1/2003 | Kobayashi ......... H05B 41/2813 315/291 |
| 2006/0279230 A1* | 12/2006 | Lee et al. ....................... 315/247 |
| 2006/0290292 A1* | 12/2006 | Li et al. ......................... 315/194 |
| 2008/0024853 A1* | 1/2008 | Tanaka ............... H05B 41/2883 359/238 |
| 2008/0164818 A1 | 7/2008 | Ichikawa et al. |
| 2009/0091269 A1 | 4/2009 | Perin et al. |
| 2010/0084987 A1 | 4/2010 | Yamauchi et al. |
| 2010/0109533 A1* | 5/2010 | Komatsu ............ H05B 41/2883 315/119 |
| 2010/0109542 A1* | 5/2010 | Komatsu ............ H05B 41/2882 315/224 |
| 2010/0194302 A1* | 8/2010 | Nakada ............... H05B 41/2883 315/224 |
| 2011/0221356 A1 | 9/2011 | Saka et al. |
| 2012/0074858 A1* | 3/2012 | Ono ................... H05B 41/2883 315/209 R |

FOREIGN PATENT DOCUMENTS

| | | |
|---|---|---|
| JP | A-2007-115534 | 5/2007 |
| JP | A-2008-34187 | 2/2008 |
| JP | A-2008-171640 | 7/2008 |
| JP | A-2009-245837 | 10/2009 |
| JP | A-2010-114064 | 5/2010 |
| JP | A-2011-23154 | 2/2011 |
| JP | A-2011-23288 | 2/2011 |
| JP | A-2011-28943 | 2/2011 |
| JP | A-2011-187369 | 9/2011 |
| JP | A-2012-14995 | 1/2012 |

* cited by examiner

|  |  | SAMPLE 1 | SAMPLE 2 | SAMPLE 3 | SAMPLE 4 | SAMPLE 5 |
|---|---|---|---|---|---|---|
| EXAMPLE 1 | COIL COME-OFF | NO | NO | NO | YES | YES |
|  | ELECTRODE BREAKAGE | NO | NO | NO | NO | NO |
|  | INTER-ELECTRODE DISTANCE MAINTENANCE | GOOD | GOOD | GOOD | GOOD | GOOD |
|  | BLACKENING | GOOD | GOOD | GOOD | GOOD | GOOD |
| EXAMPLE 2 | COIL COME-OFF | NO | NO | NO | NO | NO |
|  | ELECTRODE BREAKAGE | NO | NO | NO | NO | NO |
|  | INTER-ELECTRODE DISTANCE MAINTENANCE | GOOD | GOOD | GOOD | GOOD | GOOD |
|  | BLACKENING | GOOD | GOOD | GOOD | GOOD | GOOD |
| EXAMPLE 3 | COIL COME-OFF | NO | NO | NO | NO | NO |
|  | ELECTRODE BREAKAGE | NO | NO | NO | NO | NO |
|  | INTER-ELECTRODE DISTANCE MAINTENANCE | GOOD | GOOD | GOOD | GOOD | GOOD |
|  | BLACKENING | GOOD | GOOD | GOOD | GOOD | GOOD |

FIG.10

|  |  | SAMPLE 1 | SAMPLE 2 | SAMPLE 3 | SAMPLE 4 | SAMPLE 5 |
|---|---|---|---|---|---|---|
| COMPARATIVE EXAMPLE 1 | COIL COME-OFF | YES | YES | YES | YES | YES |
|  | ELECTRODE BREAKAGE | NO | YES | YES | YES | YES |
|  | INTER-ELECTRODE DISTANCE MAINTENANCE | GOOD | — | — | — | — |
|  | BLACKENING | GOOD | — | — | — | — |
| COMPARATIVE EXAMPLE 2 | COIL COME-OFF | YES | YES | YES | YES | YES |
|  | ELECTRODE BREAKAGE | NO | NO | YES | YES | YES |
|  | INTER-ELECTRODE DISTANCE MAINTENANCE | GOOD | GOOD | — | — | — |
|  | BLACKENING | GOOD | GOOD | — | — | — |
| COMPARATIVE EXAMPLE 3 | COIL COME-OFF | YES | YES | YES | YES | YES |
|  | ELECTRODE BREAKAGE | NO | NO | NO | NO | YES |
|  | INTER-ELECTRODE DISTANCE MAINTENANCE | GOOD | GOOD | GOOD | GOOD | — |
|  | BLACKENING | GOOD | GOOD | GOOD | GOOD | — |
| COMPARATIVE EXAMPLE 4 | COIL COME-OFF | YES | YES | YES | YES | YES |
|  | ELECTRODE BREAKAGE | NO | NO | NO | YES | YES |
|  | INTER-ELECTRODE DISTANCE MAINTENANCE | GOOD | GOOD | GOOD | — | — |
|  | BLACKENING | GOOD | GOOD | GOOD | — | — |
| COMPARATIVE EXAMPLE 5 | COIL COME-OFF | YES | YES | YES | YES | YES |
|  | ELECTRODE BREAKAGE | YES | YES | YES | YES | YES |
|  | INTER-ELECTRODE DISTANCE MAINTENANCE | — | — | — | — | — |
|  | BLACKENING | — | — | — | — | — |
| COMPARATIVE EXAMPLE 6 | COIL COME-OFF | NO | NO | NO | NO | NO |
|  | ELECTRODE BREAKAGE | NO | NO | NO | NO | NO |
|  | INTER-ELECTRODE DISTANCE MAINTENANCE | BAD | BAD | BAD | BAD | BAD |
|  | BLACKENING | GOOD | GOOD | GOOD | GOOD | GOOD |

FIG.11

DRIVING DEVICE AND DRIVING METHOD FOR DISCHARGE LAMP, LIGHT SOURCE DEVICE, AND PROJECTOR

BACKGROUND

1. Technical Field

The present invention relates to a driving technique for a discharge lamp lit by an electric discharge between electrodes.

2. Related Art

A discharge lamp such as an extra-high pressure mercury lamp or a metal halide lamp is used as a light source for an image display apparatus such as a projector. The discharge lamp is driven by, for example, a driving method for supplying a high-frequency alternating current. With the driving method, it is possible to stabilize an electric discharge, prevent so-called blackening, devitrification, and the like of a discharge lamp main body, and suppress a decrease in the life of the discharge lamp (e.g., JP-A-2007-115534).

As another driving method for the discharge lamp, there is a driving method for supplying a low-frequency alternating current having a rectangular waveform (a square wave alternating current). With the driving method, when the discharge lamp is lit, since protrusions are formed and grow at distal end portions of a pair of electrodes, it is possible to maintain a narrow electrode interval state (e.g., JP-A-2010-114064).

In light emission of the discharge lamp in the alternating-current driving, plasma density in the vicinity of the pair of electrodes changes according to positive and negative polarity switching of the alternating current. The change in the plasma density appears as a decrease or an increase in internal gas density, changes to vibration, and is propagated from the vicinity of the pair of electrodes to an inner wall. When the vibration is reflected on the inner wall and returns to the vicinity of the pair of electrodes, the vibration and the reflected vibration sometimes intensify each other according to the resonance phenomenon. A part of coil sections provided in the electrodes is damaged or the electrodes are broken by the resonance phenomenon. A basic frequency at which the resonance phenomenon occurs is referred to as an acoustic resonance frequency. The resonance phenomenon occurs not only at the acoustic resonance frequency but also at a frequency fc/2n (n is a natural number) when the acoustic resonance frequency is represented as fc. The amplitude of the vibration decreases as n increases.

In the driving method for supplying the high-frequency alternating current, when the discharge lamp is lit, the electrodes are heated by an arc discharge that occurs between the electrodes. The electrodes melt and the distance between the electrodes gradually increases. Further, the driving method for supplying the high-frequency alternating current is easily affected by the resonance phenomenon compared with the driving method for supplying the low-frequency alternating current.

On the other hand, with the driving method for supplying the low-frequency alternating current, blackening, devitrification, or the like of the discharge lamp main body occurs and the life of the discharge lamp decreases.

In the driving method for supplying the high-frequency alternating current, when the discharge lamp is lit, the electrodes are heated by an arc discharge that occurs between the electrodes. The electrodes melt and the distance between the electrodes gradually increases. On the other hand, with the driving method for supplying the low-frequency square wave alternating current, blackening, devitrification, or the like of the discharge lamp main body occurs and the life of the discharge lamp decreases.

Therefore, a driving method was attempted in which the supply of the high-frequency alternating current and the supply of the low-frequency square wave alternating current were combined. However, various problems occurred in the driving method.

SUMMARY

An advantage of some aspects of the invention is to attain, for example, a reduction in damage to the electrodes and the like when the high-frequency alternating current is supplied. Another advantage of some aspects of the invention is to solve problems that occur when the supply of the high-frequency alternating current and the supply of the low-frequency square wave alternating current are combined.

An aspect of the invention is directed to a driving device that drives a discharge lamp including a first electrode and a second electrode in a hollow section in which a discharge medium is encapsulated, the driving device including a current supplying unit configured to supply an alternating current having a frequency higher than 1 kHz to between the first electrode and the second electrode in a high-frequency period. The current supplying unit repeats a high-frequency period including a period in which a first high-frequency alternating current having a first frequency higher than 1 kHz is supplied and a period in which a second high-frequency alternating current having a second frequency higher than 1 kHz and different from the first high frequency is supplied.

In high-frequency driving, problems such as damage to the electrodes occur because of the resonance phenomenon. However, according to the aspect of the invention, in the high-frequency driving, the alternating current having the first frequency higher than 1 kHz and the alternating current having the second frequency higher than 1 kHz and different from the first frequency are supplied to the discharge lamp. Consequently, even if the resonance phenomenon occurs in a certain waveform, it is possible to reduce the likelihood of occurrence of the resonance phenomenon in another waveform having a different frequency, reduce damage to the electrodes and the like due to acoustic resonance, and reduce a light amount change while suppressing blackening and devitrification.

Another aspect of the invention is directed to a driving device that drives a discharge lamp including a first electrode and a second electrode arranged in a hollow section in which a discharge medium is encapsulated, the driving device including a current supplying unit configured to supply alternating currents having a plurality of frequencies and direct currents to between the first electrode and the second electrode. The current supplying unit has a high-frequency period in which an alternating current having a frequency higher than 1 kHz is supplied to between the first electrode and the second electrode and a low-frequency period in which an alternating current having a frequency equal to or lower than 1 kHz is supplied to between the first and second electrodes, divides the low-frequency period into first to eighth sections, supplies a first direct current in one of positive polarity and negative polarity in the first section, supplies a first low-frequency alternating current in the second section, supplies the first direct current in the other of the positive polarity and the negative polarity in the third section, supplies the first low-frequency alternating current in the fourth section, supplies a second direct current in one of the positive polarity and the negative polarity in the fifth section, supplies a second low-frequency alternating current in the sixth section, supplies the second direct current in the other of the positive polarity and the negative polarity in the seventh section, and supplies the second low-frequency alternating current in the eighth section.

The driving device according to the aspect of the invention may be configured such that the current supplying unit has a low-frequency period in which an alternating current having a frequency equal to or lower than 1 kHz is supplied to between the first electrode and the second electrode.

According to the aspect of the invention, high-frequency driving is performed in the high-frequency period and low-frequency driving is performed in the low-frequency period. By combining the high-frequency driving and the low-frequency driving, it is possible to maintain an inter-electrode distance while suppressing blackening and devitrification. Therefore, it is possible to extend the life of the discharge lamp. In the high-frequency driving, there is a problem of damage to the electrodes and the like due to the resonance phenomenon. However, according to the aspect of the invention, the alternating current having the first frequency and the alternating current having the second frequency different from the first frequency are supplied to the discharge lamp in the high-frequency period in which the high-frequency driving is performed. Consequently, even if the resonance phenomenon occurs in a certain waveform, it is possible to reduce the likelihood of occurrence of the resonance phenomenon in another waveform having a different frequency, reduce damage to the electrodes due to acoustic resonance, and reduce a light amount change.

In the driving device according to the aspect, it is preferable that the high-frequency period and the low-frequency period are alternately repeatedly set. According to the aspect, by combining the high-frequency driving and the low-frequency driving, it is possible to maintain an inter-electrode distance while suppressing blackening and devitrification.

In the driving device according to the aspect, it is preferable that the driving device further includes a voltage-value measuring unit configured to measure a first voltage value applied between the first electrode and the second electrode when a predetermined current value is applied during the high-frequency period and measure a second voltage value applied between the first electrode and the second electrode when a predetermined current value is applied during the low-frequency period, and the current supplying unit switches, when the first voltage value exceeds a predetermined first threshold, a period in which the alternating current is supplied from the high-frequency period to the low-frequency period and switches, when the second voltage value exceeds a predetermined second threshold, the period in which the alternating current is supplied from the low-frequency period to the high-frequency period.

An inter-electrode voltage changes according to an inter-electrode distance. According to the aspect of the invention, the high-frequency period in which the high-frequency driving is performed and the low-frequency period in which the low-frequency driving is performed are switched according to the inter-electrode voltage. Therefore, it is possible to maintain the inter-electrode distance within a predetermined range and extend the life of the discharge lamp.

In the driving device according to the aspect, it is preferable that, after ending the high-frequency period according to a predetermined condition, the current supplying unit alternately repeats a second high-frequency period including at least a period in which a third high-frequency alternating current having a third frequency higher than 1 kHz is supplied and a period in which a fourth high-frequency alternating current having a fourth frequency higher than 1 kHz and different from the third frequency is supplied and a low-frequency period including a period in which an alternating current having a frequency equal to or lower than 1 kHz is supplied and supplies the alternating current to between the first electrode and the second electrode.

According to the aspect of the invention, in the first high-frequency period, the high-frequency driving is executed rather than combined driving of the high-frequency driving and the low-frequency driving. Therefore, a shape change of the electrodes during warm-up immediately after an operation start is suppressed and blackening is prevented. Further, it is possible to reduce damage to the electrodes and the like. Further, in the second high-frequency period and the low-frequency period, the high-frequency driving and the low-frequency driving are alternately executed. Therefore, it is possible to maintain the inter-electrode distance while suppressing blackening and devitrification. Therefore, it is possible to extend the life of the discharge lamp. Moreover, it is possible to reduce damage to the electrodes and the like and a light amount change.

In the driving device according to the aspect, it is preferable that the current supplying unit supplies a square wave alternating current having a rectangular waveform as the first high-frequency alternating current and the second high-frequency alternating current. According to the aspect of the invention, the square wave alternating current having a rectangular waveform only has to be generated. Therefore, it is possible to generate, with a relatively simple bridge circuit, the alternating current having the first frequency and the alternating current having the second frequency.

In the driving device according to the aspect, it is preferable that the current supplying unit sets a supply time of at least one of the first high-frequency alternating current and the second high-frequency alternating current to a half cycle or less and sets a waveform in the remaining period of the cycle to a direct current. According to the aspect of the invention, the supply time of at least one of the alternating current having the first frequency and the alternating current having the second frequency is the half cycle or less. Therefore, even if the resonance phenomenon is caused by one alternating current, it is possible to reduce duration, reduce damage to the electrodes and the like due to acoustic resonance, and reduce a light amount change.

In the driving device according to the aspect, it is preferable that the current supplying unit sets the length of each of the second section and the fourth section to be integer times as large as a cycle of the first alternating current and sets the length of each of the sixth section and the eighth section to be integer times as large as a cycle of the second alternating current.

In the driving device according to the aspect, it is preferable that the current supplying unit sets the length of each of the second section, the fourth section, the sixth section, and the eighth section to be equal to or larger than 1 millisecond and smaller than 1 second.

In the driving device according to the aspect, it is preferable that the current supplying unit sets the length of the first section and the length of third section the same and sets the length of the fifth section and the length of the seventh section the same.

In the driving device according to the aspect, it is preferable that the current supplying unit sets the length of each of the first section, the third section, the fifth section, and the seventh section to be equal to or larger than 1 millisecond and smaller than 100 milliseconds.

In the driving device according to the aspect of the invention, it is preferable that the current supplying unit sets a supply period of the direct current after the supply of the first alternating current or the second alternating current having a lower frequency longer than a supply period of the direct current after the supply of the alternating current having a higher frequency.

In the driving device according to the aspect, it is preferable that the current supplying unit supplies an alternating current having a frequency higher than 1 kHz to between the first electrode and the second electrode after power-on and before the alternating currents having the plurality of frequencies are supplied. Consequently, it is possible to suppress deformation of the electrodes after the power-on. In the driving device according to the aspect, it is preferable that the frequency setting unit sets a frequency different from the frequency of the first alternating current as the frequency of the second alternating current.

Still another aspect of the invention is directed to a light source device including: the driving device; and a discharge lamp including a first electrode and a second electrode arranged in a hollow section in which a discharge medium is encapsulated. With the light source device, it is possible to reduce damage to the electrodes and the like while attaining long life of the discharge lamp.

Yet another aspect of the invention is directed to a projector including: the light source device; a modulating device configured to modulate light emitted from the discharge lamp on the basis of image information; and a projecting device configured to project the light modulated by the modulating device. According to the aspect of the invention, it is possible to reduce damage to the electrodes and the like while attaining long life of the discharge lamp. Therefore, it is possible to display a stable image for a long time.

Still yet another aspect of the invention is directed to a driving method for a discharge lamp including a first electrode and a second electrode in a hollow section in which a discharge medium is encapsulated, the driving method including: supplying an alternating current having a frequency higher than 1 kHz to between the first electrode and the second electrode in a high-frequency period; selecting at least a first frequency higher than 1 kHz and a second frequency higher than 1 kHz and different from the first frequency as the frequency of the alternating current in the high-frequency period; and repeating the high-frequency period to supply the alternating current to between the first electrode and the second electrode. According to the aspect of the invention, it is possible to reduce damage to the electrodes and the like and reduce a light amount change while suppressing blackening and devitrification.

Further another aspect of the invention is directed to a driving method for a discharge lamp including a first electrode and a second electrode arranged in a hollow section in which a discharge medium is encapsulated, the driving method including: supplying alternating currents having a plurality of frequencies and direct currents to between the first electrode and the second electrode; selecting a frequency higher than 1 kHz and a frequency equal to or lower than 1 kHz as the frequency of the alternating current; dividing a low-frequency period in which an alternating current having a frequency equal to or lower than 1 kHz is supplied to between the first and second electrodes into first to eighth sections; supplying a first direct current in one of positive polarity and negative polarity in the first section; supplying a first alternating current in the second section; supplying the first direct current in the other of the positive polarity and the negative polarity in the third section; supplying the first alternating current in the fourth section; supplying a second direct current in one of the positive polarity and the negative polarity in the fifth section; supplying a second alternating current in the sixth section; supplying the second direct current in the other of the positive polarity and the negative polarity in the seventh section; and supplying the second alternating current in the eighth section. With the driving method, it is possible to prevent narrowing and disappearance of electrode protrusion that tend to occur, for example, when the supply of an alternating current having a high frequency and the supply of a square wave alternating current having a low frequency are combined.

In the driving method for the discharge lamp according to the aspect, it is preferable that the driving method further includes: supplying an alternating current having a frequency equal to or lower than 1 kHz to between the first electrode and the second electrode in a low-frequency period; setting at least a first frequency higher than 1 kHz and a second frequency higher than 1 kHz and different from the first frequency as the frequency of an alternating current supplied in the high-frequency period; and selecting at least a third frequency equal to or lower than 1 kHz as the frequency of the alternating current supplied in the low-frequency period. According to the aspect of the invention, it is possible to extend the life of the discharge lamp while suppressing blackening and devitrification and reduce damage to the electrodes and the like due to acoustic resonance and reduce a light amount change.

BRIEF DESCRIPTION OF THE DRAWINGS

The invention will be described with reference to the accompanying drawings, wherein like numbers reference like elements.

FIG. 10 is a diagram showing measurement results in examples 1 to 3.

FIG. 11 is a diagram showing measurement results in comparative examples 1 to 6.

DESCRIPTION OF EXEMPLARY EMBODIMENTS

Modes for carrying out the invention are explained below with reference to the drawings.

First Embodiment

A light source device according to the first embodiment of the invention will be explained.

Figure 1:
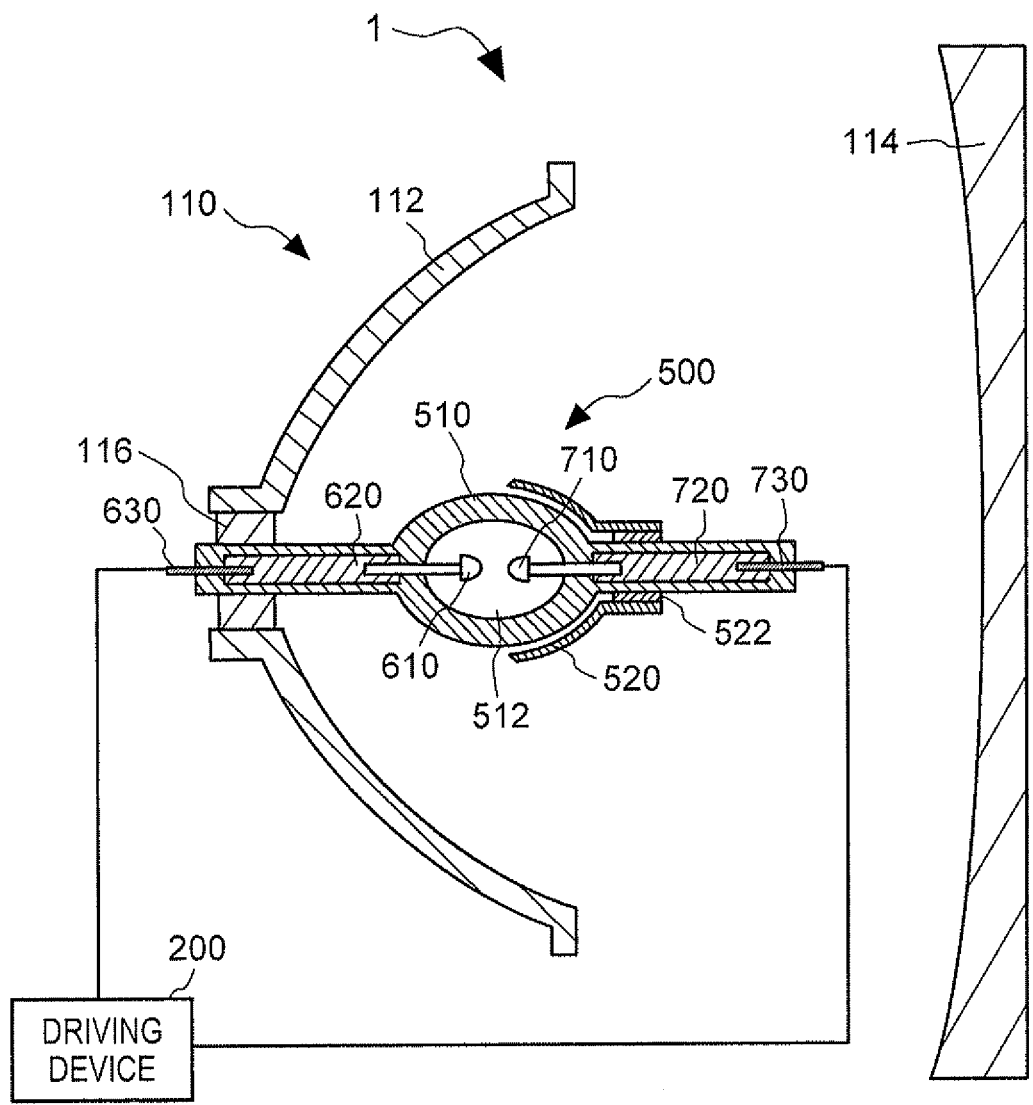
FIG. 1 is a diagram showing a light source device applied with a driving method for a discharge lamp according to a first embodiment.

FIG. 1 is a diagram showing an example of the structure of a light source device. As shown in the figure, a light source device 1 includes a light source unit 110 including a discharge lamp 500 and a driving device 200 configured to drive the discharge lamp 500. The discharge lamp 500 receives the supply of electric power from the driving device 200 to discharge electricity and emit light.

The light source unit 110 includes the discharge lamp 500, a main reflecting mirror 112 having a concave reflection surface, and a parallelizing lens 114 configured to change emitted light to substantially parallel light. The main reflecting mirror 112 and the discharge lamp 500 are bonded by an adhesive 116. A surface on the discharge lamp 500 side (the inner surface) of the main reflecting mirror 112 is a reflection surface. The reflection surface is formed as a spheroid in the configuration shown in the figure.

The shape of the reflection surface of the main reflecting mirror 112 is not limited to the spheroid and may be, for example, a paraboloid. When the reflection surface of the main reflecting mirror 112 is the paraboloid, if a light-emitting unit of the discharge lamp 500 is arranged at a so-called focus of the paraboloid, the parallelizing lens 114 can be omitted.

The discharge lamp 500 includes a discharge lamp main body 510 and a sub-reflecting mirror 520 having a reflection surface on the inner side of a concave shape. The reflection surface of the sub-reflecting mirror 520 is arranged to be opposed to the main reflecting mirror 112 and boned by an adhesive 522 to be arranged a predetermined space apart from the discharge lamp main body 510. The reflection surface of the sub-reflecting mirror 520 is formed as a spherical surface in the configuration shown in the figure.

The center of the discharge lamp main body 510 is a hollow section 512 closed in a state in which a discharge medium is encapsulated. As the discharge lamp main body 510, a material having optical transparency such as quartz glass or light transmissive ceramics is used. The discharge medium is, for example, gas for discharge start or gas contributing to light emission. Examples of the gas for discharge start include rare gases such as neon, argon, and xenon. Examples of the gas contributing to light emission include vaporized materials of mercury and metal halide.

The discharge lamp main body 510 includes a pair of electrodes 610 and 710, a pair of connecting members 620 and 720 having electrical conductivity, and a pair of electrode terminals 630 and 730. The electrodes 610 and 710 are attached to the hollow section 512. Specifically, the electrodes 610 and 710 are attached such that distal end portions thereof are opposed to each other while being a predetermined distance apart from each other in the hollow section 512 of the discharge lamp main body 510. The electrode (a first electrode) 610 and the electrode terminal 630 are electrically connected to each other by the connecting member 620. Similarly, the electrode (a second electrode) 710 and the electrode terminal 730 are electrically connected to each other by the connecting member 720. The electrode terminals 630 and 730 are respectively connected to output terminals of the driving device 200.

The driving device 200 supplies an alternating current or a direct current explained below to the electrode terminals 630 and 730. Therefore, the electrode 610 connected to the electrode terminal 630 via the connecting member 620 and the electrode 710 connected to the electrode terminal 730 via the connecting member 720 sometimes function as anodes when potential is relatively high and function as cathodes when the potential is relatively low.

When the alternating current is supplied to the electrode terminals 630 and 730, an arc discharge occurs between distal end portions of the electrodes 610 and 710 in the hollow section 512 and the discharge medium emits light. The light generated by the arc discharge is radiated from a generation position of arc (a discharge position) in all directions. Light radiated in the direction of the electrode 710 in the radiated light is reflected toward the main reflecting mirror 112 by the sub-reflecting mirror 520. Therefore, it is possible to effectively use the light radiated in the direction of the electrode 710.

In this embodiment, the discharge lamp 500 includes the sub-reflecting mirror 520. However, the discharge lamp 500 does not have to include the sub-reflecting mirror 520.

Figure 2:
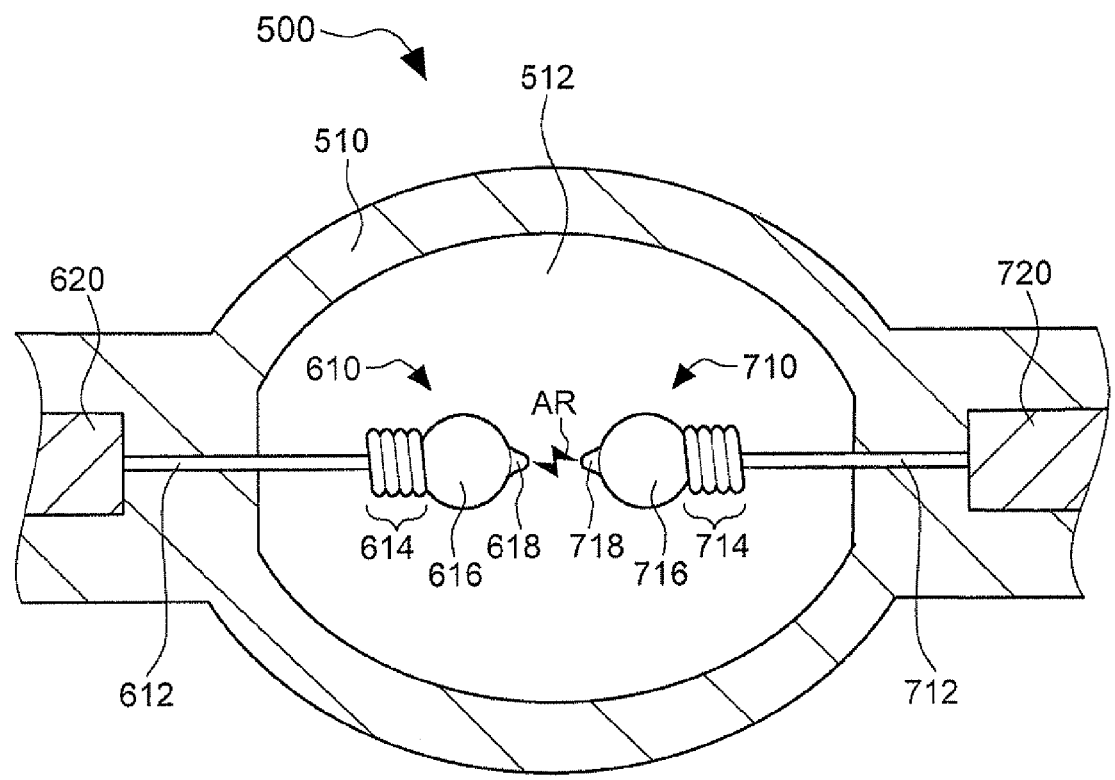
FIG. 2 is a main part sectional view of the discharge lamp in the light source device.

FIG. 2 is an example of a main part sectional view of the discharge lamp 500. In FIG. 2, the sub-reflecting mirror 520 in FIG. 1 is omitted for convenience of explanation.

As shown in FIG. 2, the electrode 610 includes a core bar 612, a coil section 614, and a main body section 616. The electrode 610 is formed by winding a wire rod of an electrode material around the core bar 612 to form the coil section 614 and heating and melting the coil section 614 at a stage before encapsulation in the discharge lamp main body 510. Consequently, a main body section 616 having a large heat capacity is formed on the distal end side of the electrode 610. The electrode 710 also includes a core bar 712, a coil section 714, and a main body section 716 and is formed the same as the electrode 610.

Examples of the material forming the electrodes 610 and 710 include a high-melting point metal material such as tungsten.

In a state in which the discharge lamp 500 is not lit at all, protrusions 618 and 718 are not formed in the main body sections 616 and 716. However, when the discharge lamp 500 is lit at least once by an arc discharge AR, the protrusions 618 and 718 are respectively formed at the distal end portions of the main body sections 616 and 716. The protrusions 618 and 718 are maintained during the lighting of the discharge lamp 500 and maintained after extinction as well.

Figure 3:
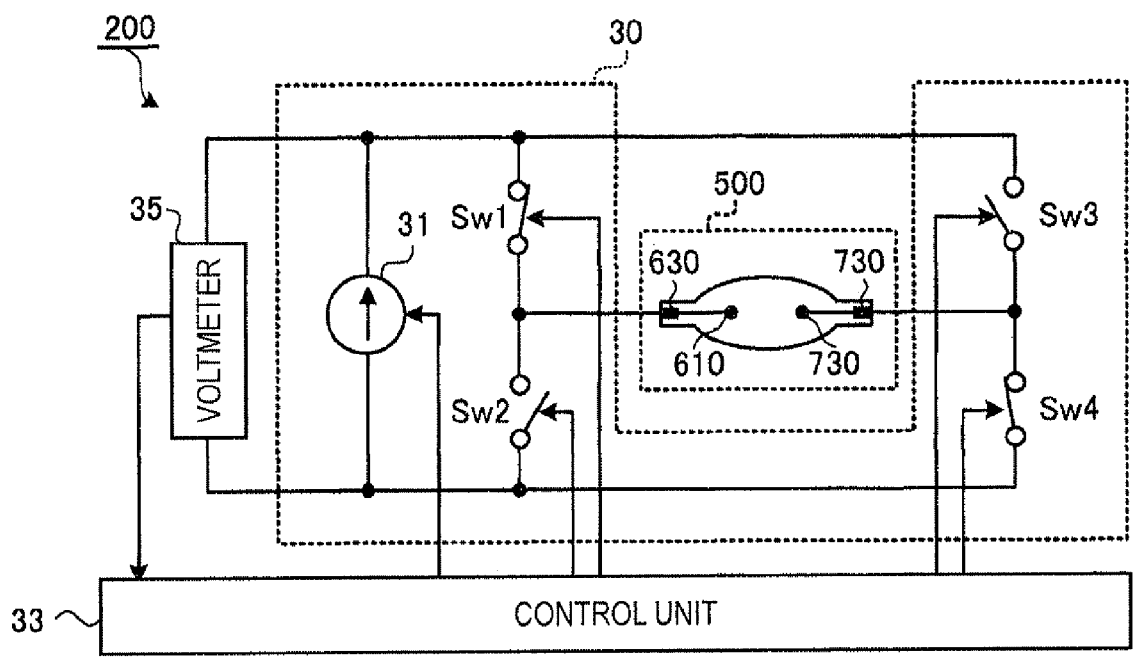
FIG. 3 is a diagram showing an electrical configuration of a driving device.

FIG. 3 is a diagram showing an example of, in particular, an electrical configuration of the driving device 200.

As shown in the figure, the driving device 200 includes a supplying unit 30 configured to supply an alternating current to the discharge lamp 500, a control unit 33 configured to control the supplying unit 30, and a voltmeter 35 configured to measure an inter-electrode voltage of the discharge lamp 500. The supplying unit 30 and the control unit 33 respectively function as a current supplying unit and a frequency setting unit. The voltmeter 35 functions as a voltage-value measuring unit.

The supplying unit 30 includes a constant current source 31 and switches Sw1 to Sw4 bridge-connected to the constant current source 31. The constant current source 31 controls a current value returned from a positive electrode output end (+) to a negative electrode output end (−) thereof to be fixed at a value designated by the control unit 33.

An ON (closed) state and an OFF (open) state of the switches Sw1 to Sw4 are controlled by the control unit 33. The switches Sw1 and Sw4 are formed as a pair and controlled to the same state. Similarly, the switches Sw2 and Sw3 are formed as a pair and controlled to the same state. However, the pair of the switches Sw1 and Sw4 and the pair of the switches Sw2 and Sw3 are controlled not to be simultaneously in the ON state and to be exclusively in the ON state each other.

The switch Sw1 is electrically interposed between the positive electrode output end (+) of the constant current source 31 and the electrode terminal 630 of the discharge lamp 500. The switch Sw2 is electrically interposed between the electrode terminal 630 and the negative electrode output end (−) of the constant current source 31. The switch Sw3 is electrically interposed between the positive electrode output end (+) of the constant current source 31 and the electrode terminal 730 of the discharge lamp 500. The switch Sw4 is electrically interposed between the electrode terminal 730 and the negative electrode output end (−) of the constant current source 31.

The voltmeter 35 measures a voltage between the positive electrode output terminal (+) and the negative electrode output terminal (−) of the constant current source 31 and supplies a measured value to the control unit 33.

In the driving device 200, when the pair of the switches Sw1 and Sw4 is controlled to an ON state by the control unit 33 and the pair of the switches Sw2 and Sw3 is controlled to an OFF state by the control unit 33, a constant current flows from the electrode 610 to the electrode 710. Conversely, when the pair of the switches Sw2 and Sw4 is controlled to the OFF state and the pair of the switches Sw2 and Sw3 is controlled to the ON state, a constant current flows from the electrode 710 to the electrode 610. Therefore, when the control unit 33 alternately switches the ON and OFF states for the pair of the switches Sw1 and Sw4 and the pair of the switches Sw2 and Sw3, an alternating current flows between the electrodes 610 and 710 and an alternating-current voltage is applied between the electrodes 610 and 710. When a switching cycle of the ON and OFF states is reduced, the frequency of the alternating current increases.

In this explanation, an electric current flowing between the electrodes 610 and 710 (or a voltage applied between the electrodes 610 and 710) has a positive value when flowing from the electrode 610 to the electrode 710 and has a negative value when flowing from the electrode 710 to the electrode 610. However, a voltage measured by the voltmeter 35 is an absolute value (a positive value) of the voltage applied between the electrodes 610 and 710 in spite of the electric current flowing to the electrodes 610 and 710.

An alternating current supplied from the driving device 200 to the discharge lamp 500 is explained. In this embodiment, high-frequency driving for, supplying an alternating current having a frequency equal to or higher than a predetermined frequency to the discharge lamp 500 and low-frequency driving for supplying a low-frequency current having a frequency lower than the predetermined frequency are combined to drive the discharge lamp 500.

Figure 4:
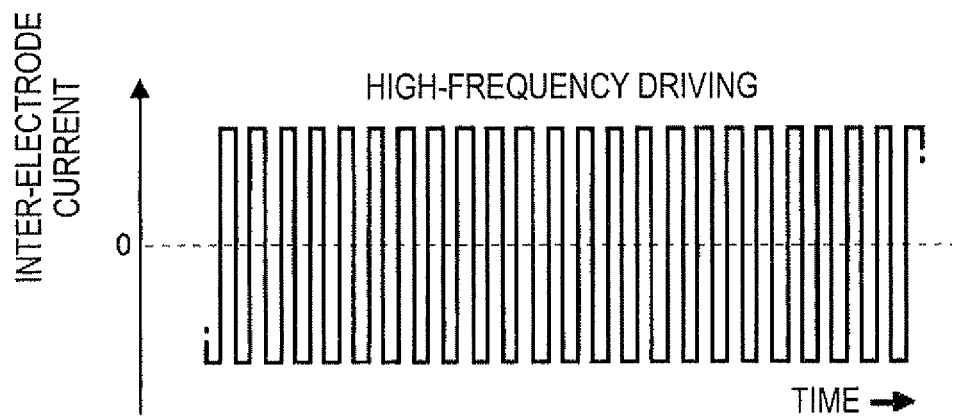
FIG. 4 is a diagram showing a current waveform of high-frequency driving.

The temperature of the electrodes 610 and 710 is high when the electrodes 610 and 710 operate as anodes compared with when the electrodes 610 and 710 operate as cathodes. As shown in FIG. 4, according to the high-frequency driving for supplying a high-frequency current to the discharge lamp 500, since a temperature change within one cycle decreases, a chemical reaction for suppressing and eliminating blackening becomes stable. It is possible to prevent blackening and devitrification and the like involved in the blackening. Therefore, a decrease in the life of the discharge lamp is suppressed.

However, in the high-frequency driving, the electrodes 610 and 710 are heated and melted because of an arc discharge that occurs between the electrodes 610 and 710. Therefore, the distance between the electrodes 610 and 710 gradually increases. When the distance between the electrodes 610 and 710 increases, light use efficiency falls. Moreover, the impedance between the electrodes 610 and 710 changes and reactive power increases. As a result, efficiency falls.

Figure 5:
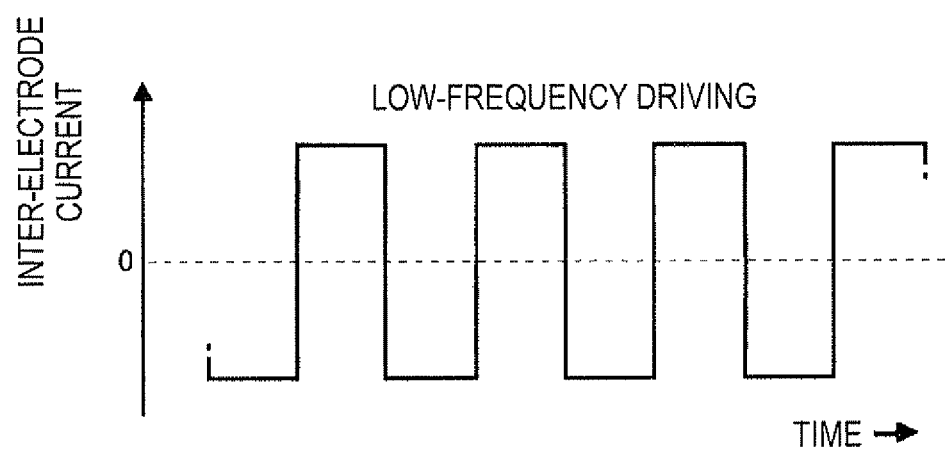
FIG. 5 is a diagram showing a current waveform of low-frequency driving.

On the other hand, as shown in FIG. 5, with the low-frequency driving for supplying a low-frequency current to the discharge lamp 500, when the discharge lamp 500 is lit, protrusions are formed at the distal end of the electrodes 610 and 710. The protrusions grow through repetition of melting and coagulation. Therefore, it is possible to maintain a narrow electrode interval state.

However, in the driving method for supplying a low-frequency current to the discharge lamp 500, since a temperature change in the discharge lamp 500 is large, the chemical reaction for suppressing blackening becomes unstable. As a result, blackening, devitrification, and the like occur and the life of the discharge lamp 500 decreases.

Figure 6:
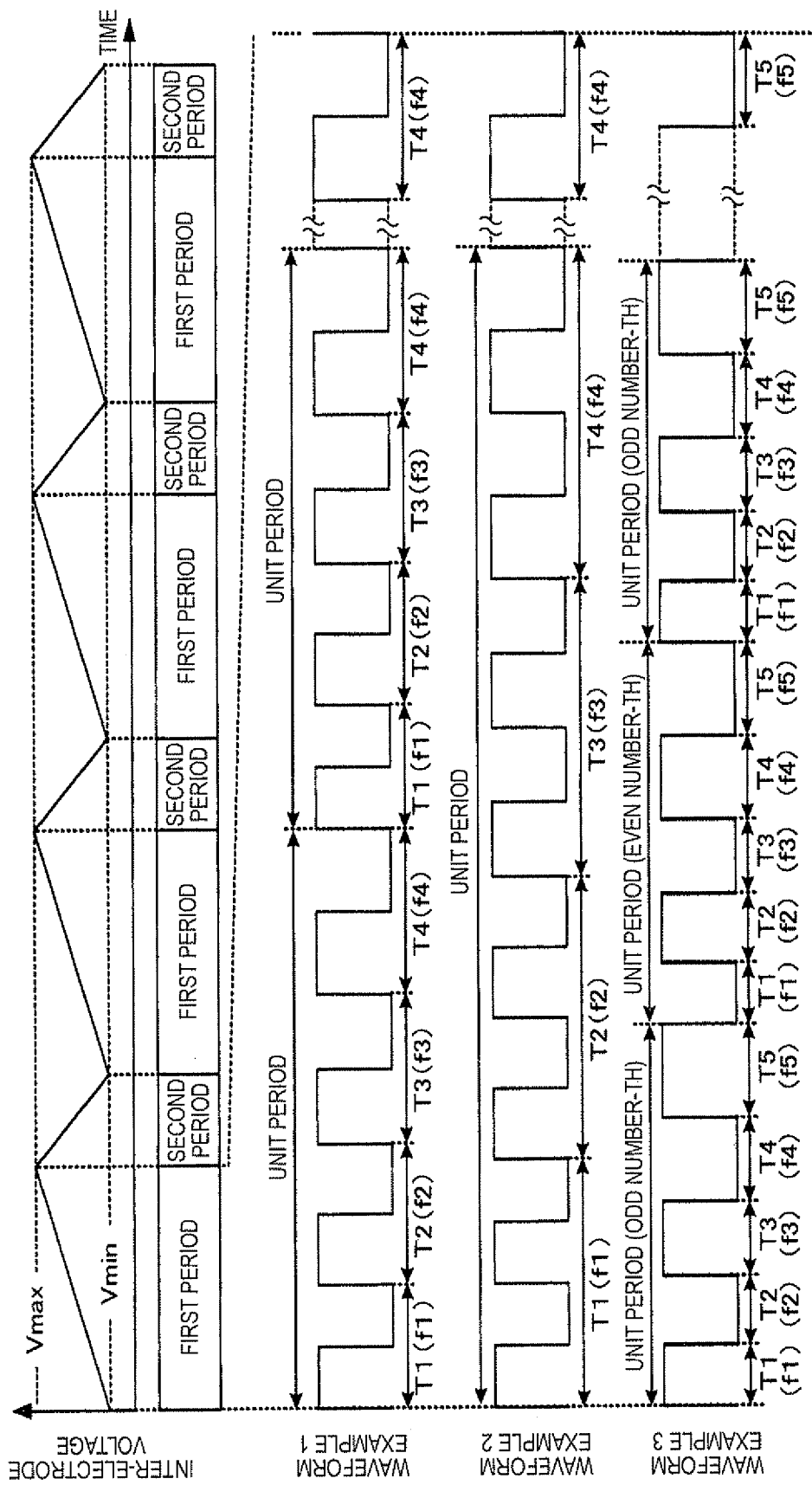
FIG. 6 is a diagram for explaining combined driving in the light source device.

Therefore, in this embodiment, as shown in FIG. 6, combined driving for combining a first period in which the high-frequency driving is executed and a second period in which the low-frequency driving is executed and alternating switching the first period and the second period is adopted.

Specifically, first, an upper limit value Vmax (a first threshold) and a lower limit value Vmin (a second threshold) are set in advance for the voltage applied between the electrodes 610 and 710. As explained above, since a constant current is fed between the electrodes 610 and 710, the voltage applied between the electrodes 610 and 710 rises as the inter-electrode distance increase. Therefore, the inter-electrode voltage indicates the distance between the electrodes 610 and 710.

Second, for example, the inter-electrode voltage is measured while the high-frequency current is supplied. When the measured voltage reaches the upper limit value Vmax, the high-frequency driving is switched to the low-frequency driving. When the high-frequency driving is switched to the low-frequency driving, as shown in FIG. 6, the inter-electrode voltage falls and the inter-electrode distance gradually decreases. On the other hand, occurrence of blackening is unavoidable.

Third, when the measured voltage reaches the lower limit value Vmin, the low-frequency driving is switched to the high-frequency driving. When the low-frequency driving is switched to the high-frequency driving, as shown in the figure, the inter-electrode voltage gradually rises and the inter-electrode distance gradually increases. On the other hand, the blackening that occurs in the low-frequency driving is sometimes eliminated by the chemical reaction.

In short, a first voltage value, which is an inter-electrode voltage obtained when a predetermined current value in the first period of the high-frequency driving is applied, is measured, a second voltage value, which is an inter-electrode voltage obtained when a predetermined current value in the second period of the low frequency driving is applied, is measured, the first period is transitioned to the second period when the first voltage value exceeds the predetermined upper limit value Vmax (the first threshold) and the second period is transitioned to the first period when the second voltage value exceeds the predetermined lower limit value Vmin (a second threshold).

With the combined driving, the inter-electrode distance is kept in a range of a distance equivalent to the lower limit value Vmin of the inter-electrode voltage to a distance equivalent to the upper limit value Vmax. In the high-frequency driving, blackening does not occur. Moreover, blackening that occurs when the low-frequency current is supplied is sometimes eliminated. Therefore, it is possible to attain both of maintenance of the inter-electrode distance and prevention of blackening. A predetermined frequency in a boundary between the high-frequency driving and the low-frequency driving only has to be determined from the viewpoint of keeping the inter-electrode distance within a predetermined range and suppressing blackening. In this example, 1 kHz is adopted as the predetermined frequency. The frequency of the low-frequency driving is preferably equal to or higher than 10 Hz and lower than 1 kHz. The frequency of the high-frequency driving is preferably equal to or higher than 1 kHz and lower than 10 GHz.

In light emission of the discharge lamp 500 in the alternating-current driving, plasma density in the vicinity of the electrodes 610 and 710 changes according to positive and negative polarity switching of the alternating current. The change in the plasma density appears as a decrease or an increase in internal gas density, changes to vibration, and is propagated from the center of the hollow section 512 to the inner wall of the hollow section 512. When the vibration is reflected on the inner wall of the hollow section 512 and returns to the vicinity of the electrodes 610 and 710, the vibration and the reflected vibration sometimes intensify each other according to the resonance phenomenon. The frequency of the alternating current is referred to as acoustic resonance frequency fc. The acoustic resonance frequency fc depends on the shape, internal gas, and the like of the discharge lamp 500.

The electrodes 610 and 710 are vibrated by the resonance phenomenon. In some case, a part of the coil section 614 and the coil section 714 is damaged or the electrodes 610 and 710 are broken. Further, a light amount changes according to the density of plasma and light emission becomes unstable.

The acoustic resonance frequency fc depends on the shape of the discharge lamp 500. The acoustic resonance frequency fc is often several ten kilohertz (e.g., 60 kHz) in a small discharge lamp used in a projector. However, acoustic resonance also occurs when the frequency of the alternating current is fc/2n (n is a natural number).

Figure 7:
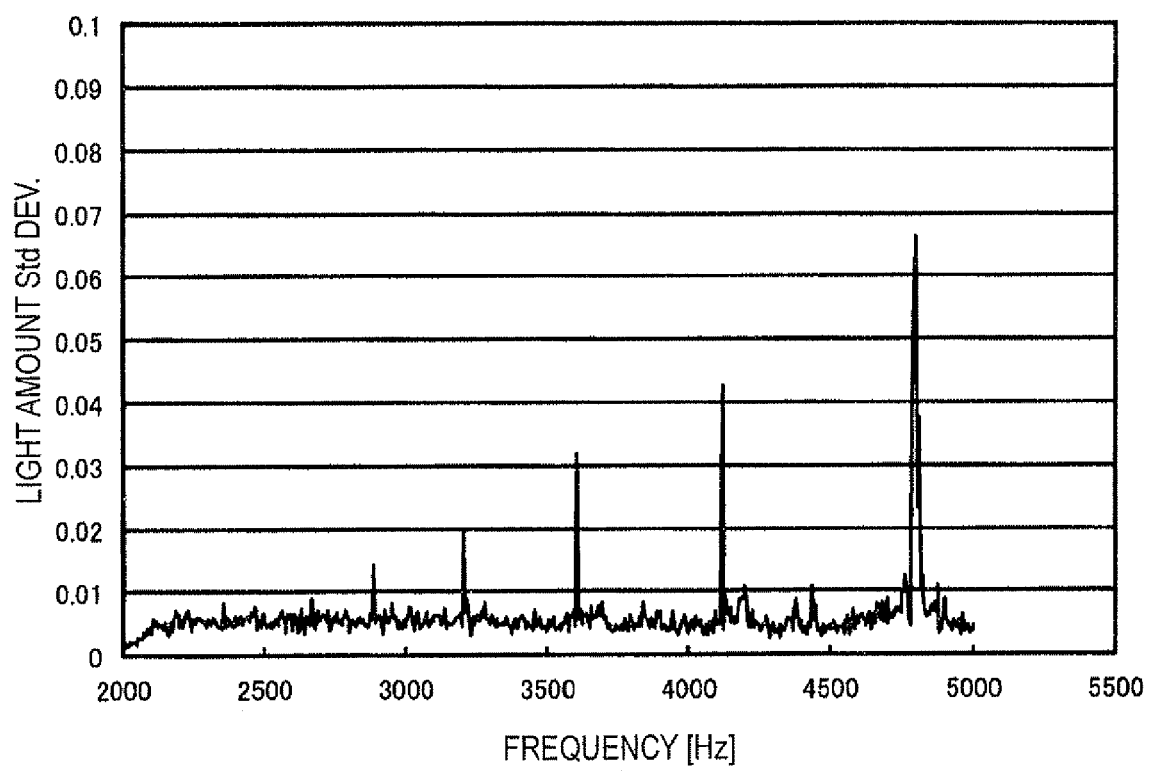
FIG. 7 is a graph showing an example of a relation between the frequency of an alternating current and a standard deviation of a light amount of a discharge lamp.

In FIG. 7, an example of a relation between the frequency of the alternating current and a standard deviation of a light amount of the discharge lamp 500 is shown. A peak of the light amount occurs according to the resonance phenomenon. A light amount change gradually decreases as the frequency decreases. In the low-frequency driving (smaller than 1 kHz), the influence of the resonance phenomenon disappears. From the viewpoint of reducing the breakage of the coil sections and the electrodes and the light amount change due to the acoustic resonance, which are the problems in the high-frequency driving, it is preferable to set the frequency of the alternating current to a frequency at which the resonance phenomenon does not occur.

The acoustic resonance frequency fc depends on the shape and the internal gas of the discharge lamp 500 as explained above. The acoustic resonance frequency fc changes according to manufacturing irregularity of the discharge lamp 500. Therefore, it is difficult to set the frequency of the alternating current to prevent the resonance phenomenon from occurring in all mass-produced discharge lamps 500.

Therefore, in this embodiment in the high-frequency driving susceptible to the influence of the resonance phenomenon, a plurality of kinds of waveforms, frequencies of which are equal to or higher than a predetermined frequency and cycles of which are different from one another, are switched to generate an alternating current. That is, in a period of the high-frequency driving, a plurality of kinds of frequencies are switched to generate an alternating current. As a result, even if the resonance phenomenon occurs at one of a plurality of kinds of frequencies selected in the high-frequency driving, it is possible to reduce the likelihood of occurrence of the resonance phenomenon at the other frequencies, reduce breakage of the coil sections and the electrodes due to acoustic resonance, and reduce a light amount change.

Specific examples of alternating current waveforms in the first period corresponding to the high-frequency driving are shown in FIG. 6. In a waveform example 1, a waveform of one cycle of a cycle T1 (a frequency f1), a waveform of one cycle of a cycle T2 (a frequency f2), a waveform of one cycle of a cycle T3 (a frequency f3), and a waveform of one cycle of a cycle T4 (a frequency f4) are set as one unit. The unit of the waveforms is repeated.

In a waveform example 2, a waveform of two cycles of the cycle T1 (the frequency f1), a waveform of two cycles of the cycle T2 (the frequency f2), a waveform of two cycles of the cycle T3 (the frequency f3), and a waveform of two cycles of the cycle T4 (the frequency f4) are set as one unit. The unit of the waveforms is repeated.

In a waveform example 3, a waveform of a half cycle of the cycle T1 (the frequency f1), a waveform of a half cycle of the cycle T2 (the frequency f2), a waveform of a half cycle of the cycle T3 (the frequency f3), a waveform of a half cycle of the cycle T4 (the frequency f4), and a waveform of a half cycle of a cycle T5 (a frequency f) are set as one unit. The unit of the waveforms is repeated. As explained above, the resonance phenomenon occurs when an increase and a decrease in the internal gas density change to vibration, the vibration is reflected on the inner wall of the hollow section 512, and the vibration and the reflected vibration intensify each other when reaching the vicinity of the electrodes 610 and 710. The vibration and the reflected vibration repeatedly intensify each other, whereby the amplitude of the vibration increases. In the waveform example 3, the frequency is switched at each half cycle. Therefore, even if the frequency of a certain waveform causes acoustic resonance, a waveform of a different frequency is selected at the next half cycle. Since the waveform of the different frequency is selected, it is possible to reduce the likelihood that the vibration and the reflected vibration intensify each other. Therefore, with the waveform example 3, it is possible to substantially suppress damage to a part of the coil sections and breakage of the electrode.

In the waveform example 3, the waveforms of odd number types (three or more types) are switched to be reversed at each half cycle. In this case, it is possible to equalize time of positive polarity and time of negative polarity in an odd number-th unit period and an even number-th unit period. Consequently, it is possible to set temperature loads of the electrodes 610 and 710 to the same degree and extend the life of the discharge lamp 500.

Waveforms of even number types (two or more types) may be switched to be reversed at each half cycle. In the waveform examples 1 to 3, the waveforms are rectangular square wave alternating currents. That is, an alternating current is generated by switching a direct current. Further, in the second period of the high-frequency driving, a supply time of at least one of the first alternating current having the first frequency and the second alternating current having the second frequency may be a half cycle or less. A waveform in the supply time is a direct current.

Figure 8:
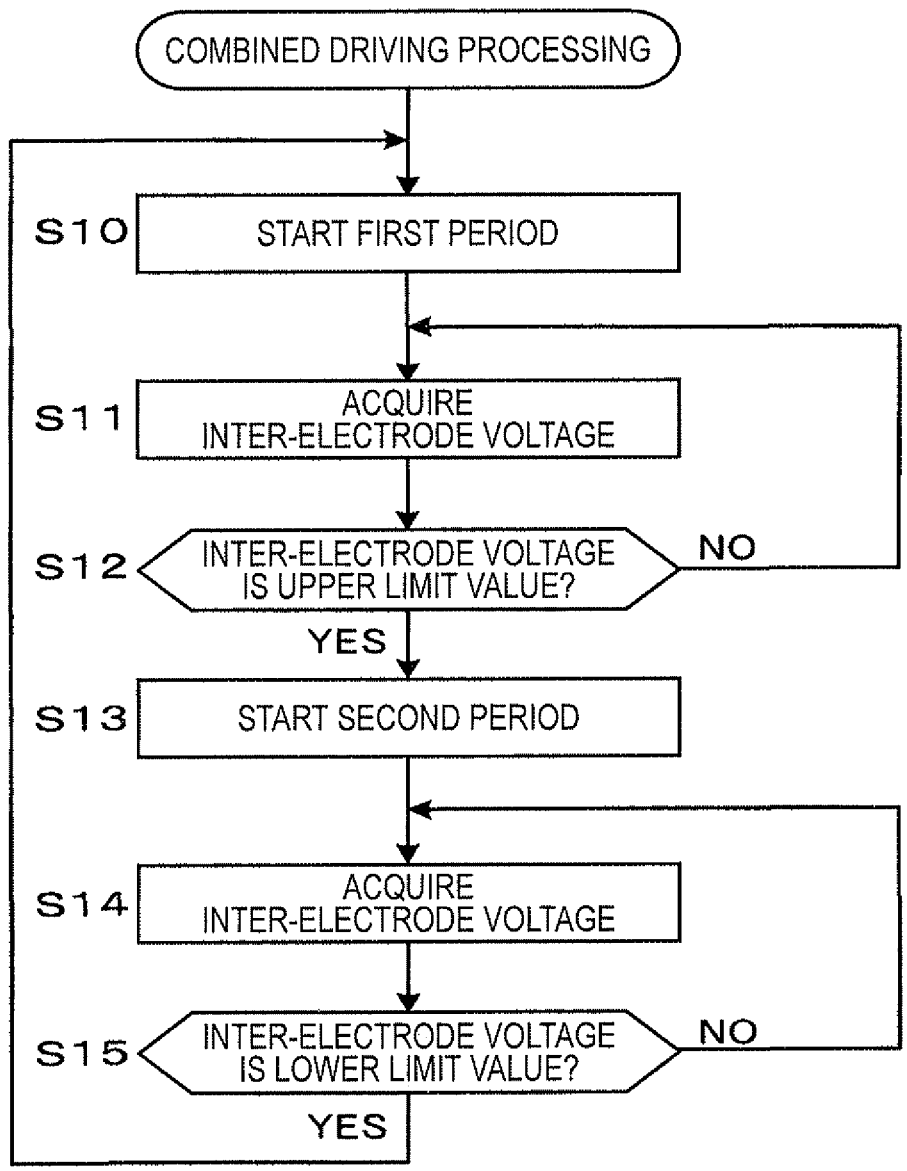
FIG. 8 is a flowchart for explaining details of combined driving processing in the light source device.

FIG. 8 is a flowchart for explaining combined driving processing. The combined driving processing is executed by the driving device 200.

First, the control unit 33 of the driving device 200 sets a cycle for alternating switching the ON and OFF states for the pair of the switches Sw1 and Sw4 and the pair of the switches Sw2 and Sw3 to the first period corresponding to the high-frequency driving (step S10). Consequently, a high-frequency current flows to the electrodes 610 and 710 of the discharge lamp 500.

Subsequently, the control unit 33 acquires an inter-electrode voltage measured by the voltmeter 35 (step S11) and determines whether the voltage has reached the upper limit value Vmax (step S12). When the voltage has not reached the upper limit value Vmax (when a determination result in step S12 is "NO"), the control unit 33 returns the processing procedure to step S11. However, since the inter-electrode distance increases in the first period in which the high-frequency current is supplied to the discharge lamp 500, the inter-electrode voltage reaches the upper limit value Vmax soon.

When the inter-electrode voltage has reached the upper limit value Vmax (when the determination result in step S12 is "YES"), the control unit 33 switches the cycle for alternately switching the ON and OFF states for the pair of the switches Sw1 and Sw4 and the pair of the switches Sw2 and Sw3 to a cycle of the low-frequency driving and starts the second period (step S13). Consequently, the electric current flowing to the electrodes 610 and 710 of the discharge lamp 500 is switched from the high-frequency current to a low-frequency current. The control unit 33 acquires the inter-electrode voltage measured by the voltmeter 35 (step S14) and determines whether the voltage has reached the lower limit value Vmin (step S15). When the voltage has not reached the lower limit value Vmin (when a determination result in step S15 is "NO"), the control unit 33 returns the processing procedure to step S14. However, since the inter-electrode distance decreases when the low-frequency current is supplied to the discharge lamp 500, the inter-electrode voltage reaches the lower limit value Vmin soon. When the inter-electrode voltage has reached the lower limit value Vmin (when the determination result in step S15 is "YES"), the control unit 33 returns the processing procedure to step S10. Consequently, the electric current flowing to the electrodes 610 and 710 of the discharge lamp 500 is switched from the low-frequency current to the high-frequency current.

Figure 9:
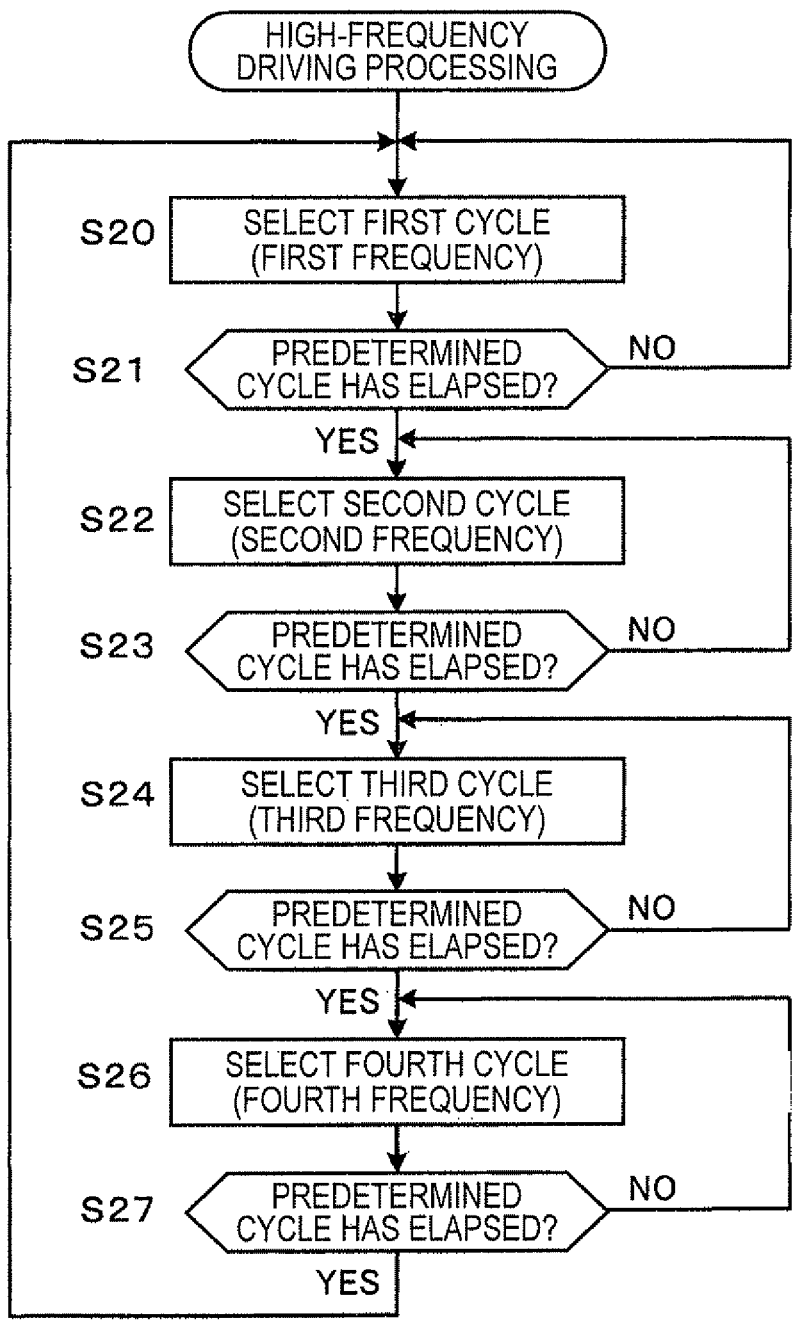
FIG. 9 is a flowchart for explaining details of high-frequency driving processing in the light source device.

FIG. 9 is a flowchart for explaining high-frequency driving processing executed in the first period. In this example, the waveform example 2 shown in FIG. 6 is generated. When the first period is started, the control unit 33 selects the first cycle T1 (the frequency f1) (step S20) and, thereafter, determines whether a predetermined cycle has elapsed (step S21). In this example, since the predetermined cycle is two cycles, the control unit 33 determines whether a waveform having the frequency f1 is generated for the two cycles. When the predetermined cycle has not elapsed, the control unit 33 returns the processing to step S20 and repeats the steps S20 and S21 until the two cycles elapse.

When the waveform having the frequency f1 is generated for the two cycles, a determination result in step S21 is "YES". The control unit 33 selects the second cycle T2 (the frequency f2) (step S22) and, thereafter, determines whether the predetermined cycle has elapsed (step S23). When a waveform having the frequency f2 is generated for the two cycles, a determination result in step S23 is "YES". The control unit 33 selects the third cycle T3 (the frequency f3) (step S24) and, thereafter, determines whether the predetermined period has elapsed (step S25). When a waveform having the frequency f3 is generated for the two cycles, a determination result in step S25 is "YES". The control unit 33 selects the fourth cycle T4 (the frequency f4) (step S26) and, thereafter, determines whether the predetermined period has elapsed (step S27). When a waveform having the frequency f4 is generated for the two cycles, a determination result in step S26 is "YES". The control unit 33 returns the processing to step S20. Consequently, until the first period ends, the waveform having the frequency f1, the waveform having the frequency f2, the waveform having the frequency f3, and the waveform having the frequency f4 are repeatedly selected.

In this example, the predetermined cycle is the two cycles. However, when the waveform example 1 shown in FIG. 6 is generated, the predetermined cycle is one cycle. When the waveform example 3 shown in FIG. 6 is generated, the predetermined cycle is a half cycle. Further, in a plurality of kinds of frequencies, the predetermined cycle does not have to be the same and is arbitrary. For example, the frequency f1 may be set as one cycle, the frequency f2 may be set as one and half cycle, the frequency f3 may be set as two cycles, and the frequency f4 may be set as two and half cycles. The order of selection of the plurality of kinds of frequencies does not have to be fixed for each unit period and may be random or may be set in advance. For example, in a first unit period, the order may be the frequency f1, the frequency f2, the frequency f3, and the frequency f4. In a second unit period, the order may be the frequency f2, the frequency f3, the frequency f4, and the frequency f1. From the viewpoint of preventing the same frequency from continuing, it is preferable to set a frequency selected at the end of a certain unit period and a frequency selected in the beginning of the next unit period to be different.

Examples of the invention are explained in comparison with comparative examples.

The examples are the light source device 1 shown in FIGS. 1 to 3. The discharge lamp 500 shown in FIG. 2 is used. Driving conditions for the examples are as described below.

Example 1

Material forming a discharge lamp main body: quartz glass

Encapsulated object in the discharge lamp main body: argon, mercury, bromine methyl Atmospheric pressure at the time of lighting in the discharge lamp main body: 200 atm
Material forming electrodes: tungsten
Inter-electrode distance: 1.1 mm
Rated power: 200 W
Alternating-current current value (average): 2.9 A
Frequency of a low-frequency current: 135 Hz (rectangular wave, Duty ratio 50%)
Frequency of a high-frequency current: 5 kHz→4.54 kHz→4.16 kHz→3.86 kHz→3.55 kHz→3.33 kHz at each four cycles and thereafter repeated Example 2

Frequency of a high-frequency current: set to 5 kHz→4.54 kHz→4.16 kHz→3.86 kHz→3.55 kHz→3.33 kHz at each one cycle and thereafter repeated
The other conditions are the same as those in Example 1

Example 3

Frequency of a high-frequency current: set to 5 kHz→4.54 kHz→4.16 kHz→3.86 kHz→3.55 kHz→3.33 kHz at each half cycle and thereafter repeated
The other conditions are the same as those in Example 1

Comparative Example 1

Frequency of a high-frequency current: 5 kHz (rectangular wave, Duty ratio 50%)
The other conditions are the same as those in Example 1

Comparative Example 2

Frequency of a high-frequency current: 4.16 kHz (rectangular wave, Duty ratio 50%
The other conditions are the same as those in Example 1

Comparative Example 3

Frequency of a high-frequency current: 3.86 kHz (rectangular wave, Duty ratio 50%)
The other conditions are the same as those in Example 1

Comparative Example 4

Frequency of a high-frequency current: 3.33 kHz (rectangular wave, Duty ratio 50%
The other conditions are the same as those in Example 1

Comparative Example 5

The low-frequency driving is cancelled and only the high-frequency driving is performed
Frequency of a high-frequency current: 5 kHz (rectangular wave, Duty ratio 50%)
The other conditions are the same as those in Example 1

Comparative Example 6

The low-frequency driving is cancelled and only the high-frequency driving is performed
Frequency of a high-frequency current: set to 5 kHz→4.54 kHz→4.16 kHz→3.86 kHz→3.55 kHz→3.33 kHz at each one cycle and thereafter repeated Evaluation Concerning the examples 1 to 3 and the comparative examples 1 to 6, a lighting test was performed for five samples for each of the examples and the comparative examples and electrode states were checked at a point when 200 hours elapsed. Evaluation results of the examples 1 to 3 are shown in FIG. 10. Evaluation results of the comparative examples 1 to 6 are shown in FIG. 11. Inter-electrode distance maintenance was evaluated concerning an inter-electrode voltage. The inter-electrode distance maintenance was evaluates as "good" at the inter-electrode voltage of 70V to 80V, evaluated as "faire" at the inter-electrode voltage of 80V to 100V, and evaluated as "bad" at the inter-electrode voltage of 100V or higher. Concerning blackening, the blackening was evaluated as "good" in a state in which there was no blackening anywhere, evaluated as "faire" when the blackening was found in base portions of the electrodes, and evaluated as "bad" when the blackening was found over the entire pipes.

As shown in FIGS. 10 and 11, in the comparative examples 1 to 4, coil come-off and electrode breakage occurred. In the comparative example 5, the coil come-off and the electrode breakage occurred and the inter-electrode distance was not maintained. Further, in the comparative example 6, the coil come-off and the electrode breakage did not occur but the inter-electrode distance was not maintained.

On the other hand, in the example 1, although the coil come-off occurred in a part of the samples, the electrode breakage did not occur at all and the inter-electrode distance was maintained. In the examples 2 and 3, the coil come-off and the electrode breakage did not occur and the inter-electrode distance was maintained in all the samples. Consequently, it is possible to extend the life of the discharge lamp while suppressing damage to a part of the coil sections and breakage of the electrodes by switching the plurality of kinds of waveforms, the cycles of which are different from one another the first period, to generate an alternating current.

As it is evident from the example 1, it is possible to reduce damage to the coil sections and the electrodes by switching the waveform at each four cycles. As it is evident from the example 3, when the waveform is switched at each half cycle, it is possible to further reduce damage to the coil sections and the electrodes. Therefore, it is preferable to set time for selecting one of the plurality of kinds of waveforms in the first period to be equal to or longer than a half cycle and equal to or shorter than four cycles of the selected one kind of waveform.

Second Embodiment

A second embodiment of the invention is explained. The light source device 1 in this embodiment is the same as the light source device 1 in the first embodiment. An electrical configuration of the driving device 200 is also the same as that in the first embodiment. However, in this embodiment, a switching control method for the switches Sw1 to Sw4 by the control unit 33 is different from that in the first embodiment.

In this embodiment, in the high-frequency driving for supplying an alternating-current having a frequency equal to or higher than a predetermined frequency to the discharge lamp 500, a plurality of kinds of waveforms, frequencies of which are equal to or higher than the predetermined frequency and cycles of which are different from one another, are switched to generate an alternating current. That is, in this embodiment, combined driving for combining a period in which the high-frequency driving is executed and a period in which the low-frequency driving is executed and alternately switching the periods is not performed. The high-frequency driving is executed in all periods. However, concerning an alternating current waveform of the high-frequency driving, like the waveforms explained with reference to FIG. 6 in the first embodiment, a plurality of kinds of waveforms, cycles of which are different from one another, are switched to generate an alternating current as in the waveform example 1, the waveform example 2, and the waveform example 3.

A flowchart of high-frequency driving processing in this embodiment is the same as the flowchart of the high-frequency driving processing explained with reference to FIG. 9 in the first embodiment. In this embodiment, the high-frequency driving processing shown in FIG. 9 is performed over all the periods.

According to, this embodiment, even when the high-frequency driving processing is performed, it is possible to reduce damage to the coil sections and the electrodes due to acoustic resonance and reduce a light amount change.

Third Embodiment

Figure 12:
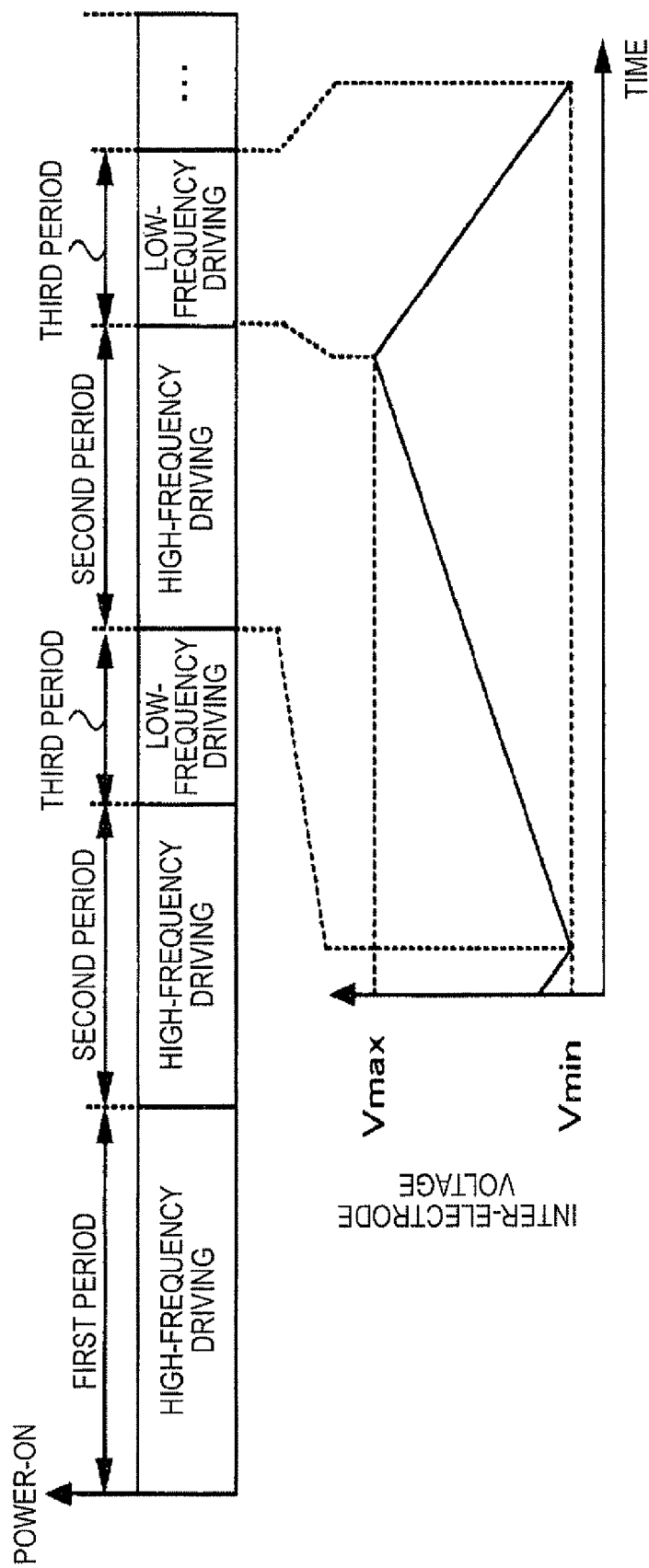
FIG. 12 is a diagram for explaining combined driving in a light source device according to a third embodiment.

A third embodiment of the invention is explained. This embodiment is different from the second embodiment in that, as shown in FIG. 12, the high-frequency driving is executed in the first period immediately after power-on and the combined driving of the high-frequency driving and the low-frequency driving is performed in the second and third periods.

The high-frequency driving in this embodiment is executed by switching a plurality of kinds of waveforms, cycles of which are different from one another, as in the second embodiment. Consequently, it is possible to suppress a shape change of the electrodes 610 and 710 during warm-up, prevent blackening, and reduce damage to the coil sections and electrodes. The control unit 33 ends the first period when a predetermined condition is met. For example, the control unit 33 may ends the first period when time from power-on reaches a predetermined time.

Subsequently, the combined driving is executed in the second and third periods after the first period to attain both of maintenance of an inter-electrode distance and prevention of blackening. The second period in this embodiment corresponds to the first period shown in FIG. 5 in the first embodiment. The third period in this embodiment corresponds to the second period shown in FIG. 5 in the first embodiment. The combined driving in the second and third periods is the same as the combined driving in the first embodiment. Therefore, detailed explanation of the combined driving is omitted.

In this embodiment, when examples and comparative examples were compared under conditions same as the conditions in the first embodiment, effects same as the effects in the first embodiment were obtained.

Fourth Embodiment

Figure 13:
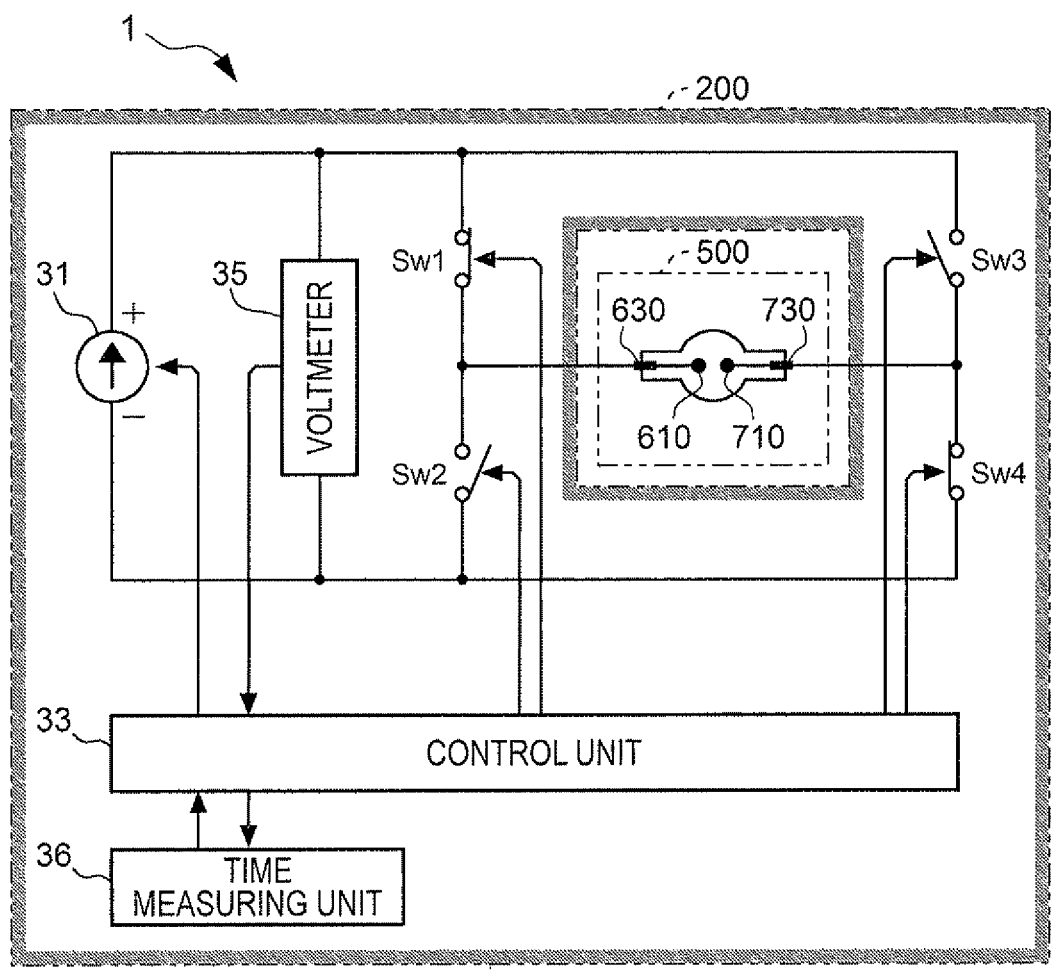
FIG. 13 is a diagram showing an electrical configuration of a light source device according to a fourth embodiment.

A fourth embodiment of the invention is explained. The optical device 1 in this embodiment is different from the optical device 1 in the embodiments explained above in that the optical device 1 in this embodiment includes a time measuring unit 36 as shown in FIG. 13. The time measuring unit 36 measures time according to an instruction of the control unit 33 and supplies the measured time to the control unit 33. The other components in the optical device 1 are common to the embodiments explained above. Therefore, explanation of the components is omitted. In this embodiment, a switching control method for the switches Sw1 to Sw4 by the control unit is different from the switching control method in the embodiments explained above. The switching control method in this embodiment is explained.

In this embodiment, as in the embodiments explained above, the combined driving for combining and alternately switching the high-frequency driving and the low-frequency driving is performed.

With the combined driving, an inter-electrode distance is maintained in a range of a distance equivalent to a lower limit value of an inter-electrode voltage to a distance equivalent to an upper limit value. In the high-frequency driving, blackening does not occur. Moreover, even if blackening occurs when a low-frequency current is supplied, the blackening is sometimes eliminated. Therefore, it is expected that both of maintenance of the inter-electrode distance and prevention of blackening are attained.

However, when a single frequency of, for example, about 150 Hz is used for the low-frequency driving in the combined driving, it is possible to satisfactorily extend the protrusions and reduce the inter-electrode distance at an initial stage. However, when operation is continued for about several hundred hours, the shape of the electrodes gently changes and the protrusions gradually decrease in diameter. In some cases, the protrusions suddenly disappear.

Second, when ON (activation) and OFF (interruption) of the power supply for the light source device 1 are repeated, the combined driving sometimes fails.

Therefore, first, in this embodiment, in the low-frequency driving, not only a low-frequency current having one frequency but also low-frequency currents having different frequencies, i.e., at least a first square wave alternating current (a first alternating current) and a second square wave alternating current (a second alternating current) are used.

When the frequency in the low-frequency driving is set to be equal to or higher than 1 Hz and lower than 1 kHz, the protrusions can be extended. Therefore, it is preferable to set the frequency of the first alternating current and the frequency of the second alternating current to be different from each other and included in the frequency range. As the frequency is lower, thicker protrusions are formed but an extension rate of the protrusions is smaller.

On the other hand, when a direct current is supplied to the electrodes 610 and 710, the protrusions and electrode portions around the protrusions melt. In the melting, it is preferable to fluidize the protrusions and the electrode portions to a degree in which the protrusions and the electrode portions do not evaporate and roundness of the shape thereof is moderately kept by the surface tension. When an alternating current is supplied after the supply of the direct current, the protrusions fluidized by the supply of the direct current is pulled in an electric field direction. Therefore, there is an effect that the protrusions can be extended. Therefore, in this embodiment, the alternating current is supplied after the direct current in the low-frequency driving.

As explained above, there are two kinds of alternating currents, i.e., the first alternating current and the second alternating current as the alternating current of the low-frequency driving in the combined driving. The direct current needs to be supplied to correspond to each of the first alternating current and the second alternating current. Further, if the direct current is supplied only from one of the electrodes 610 and 710 to the other, the protrusions are unevenly present in one electrode. Therefore, the direct current is supplied in both a positive polarity and a negative polarity.

Eventually, as explained above, there are the two kinds of alternating currents, i.e., the first alternating current and the second alternating current as the alternating current in the low-frequency driving. The direct current in the positive polarity and the direct current in the negative polarity need to be set to correspond to each of the first alternating current and the second alternating current.

Figure 14:
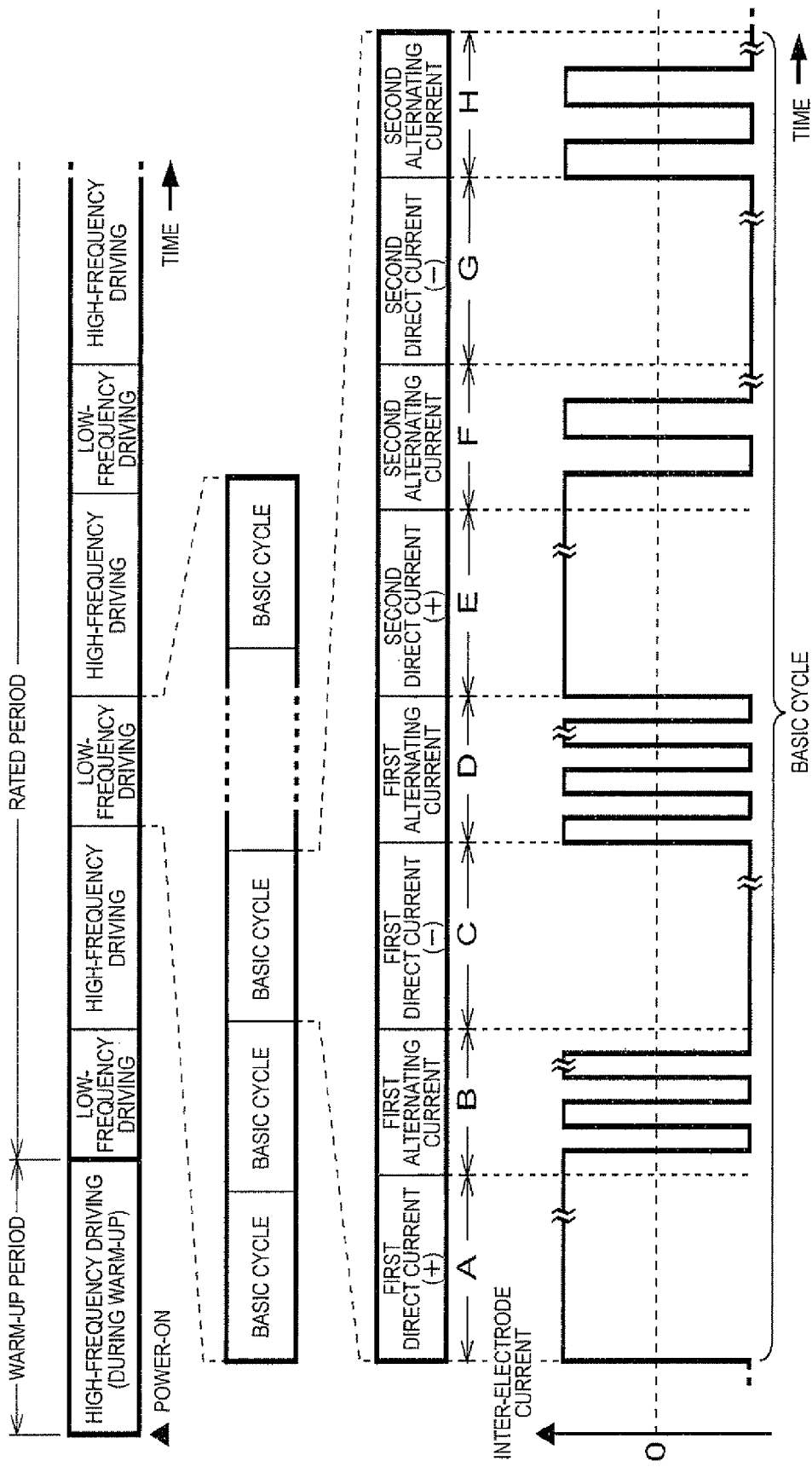
FIG. 14 is a diagram showing current waveforms of high-frequency driving and low-frequency driving.

Therefore, in this embodiment, as shown in FIG. 14, the low-frequency driving in the combined driving is a repeated pattern of a basic cycle explained below.

The basic cycle is divided into a first section A to an eighth section H. In the first section A, a first direct current is supplied in, for example, positive polarity (+). The first alternating current corresponding to the positive polarity (+) of the first direct current is supplied in the second section B. In the third section C, the first direct current is supplied in negative polarity (−), which is the opposite polarity. The first alternating current corresponding to the negative polarity (−) of the first direct current is supplied in the fourth section D. Subsequently, in the fifth section E, a second direct current is supplied in positive polarity (+). The second alternating current corresponding to the positive polarity (+) of the second direct current is supplied in the sixth section F. In the seventh section G, the second direct current is supplied in negative polarity (−). The second alternating current corresponding to the negative polarity (−) of the second direct current is supplied in the eighth section H.

It has been experimentally confirmed that, from the viewpoint of pulling the protrusions, it is preferable to adjust each of temporal lengths of the second section B, the fourth section D, the sixth section F, and the eighth section H, in which the first alternating current and the second alternating current are supplied, according to respective conditions such as the shape of the discharge lamp 500 in a range of time equal to or longer than 1 millisecond and shorter than 1 second.

From the viewpoint of moderately fluidizing the protrusions, it is preferable to adjust the temporal lengths of the first section A, the third section C, the fifth section E, and the seventh section G, in which the first direct current and the second direct current are supplied, to time equal to or longer than 1 millisecond and shorter than 100 milliseconds.

On the other hand, as explained above, as a frequency is lower, thicker protrusions tend to be formed. Therefore, a supply period of the direct current after the supply of the first alternating current or the second alternating current having a lower frequency may be set longer than a supply period of the direct current after the supply of the first alternating current or the second alternating current having a higher frequency. Specifically, when the frequency of the second alternating current is lower than the frequency of the first alternating current, it is preferable to set, taking into account the repetition of the sections, each of the temporal lengths of the seventh section G and the first section A after the second alternating current longer than the temporal lengths of the third section C and the fifth section E after the first alternating current. Conversely, when the frequency of the first alternating current is lower than the frequency of the second alternating current, it is preferable to set each of the temporal lengths of the third section C and the fifth section E longer than the temporal lengths of the seventh section G and the first section A.

In an example shown in FIG. 14, the direct current of the positive polarity is supplied in the first section A and the fifth section E and the direct current of the negative polarity is supplied in the third section C and the seventh section G. Conversely, the direct current of the negative polarity may be supplied in the first section A and the fifth section. E and the direct current of the positive polarity may be supplied in the third section C and the seventh section G.

In the basic cycle, only the two kinds of alternating currents, i.e., the first alternating current and the second alternating current are used. However, three or more kinds of alternating currents may be used.

An example of a method of solving a second problem is explained.

In a state in which a sufficient time has elapsed from the last state of use, the electrode temperature of the discharge lamp 500 is nearly the room temperature and the pressure of the hollow section 512 falls. On the other hand, in a rated state of the discharge lamp 500, the temperature of the electrodes 610 and 710 of the discharge lamp 500 is extremely high (equal to or higher than 1000° C.) and the pressure of the hollow section 512 is also high (equal to or higher than 50 atm). Therefore, in order to quickly shift the discharge lamp 500 to the rated state after the power supply is turned on, it is necessary to supply an electric current close to a rated current or equivalent to the rated current to the discharge lamp 500 after the power-on. However, after the power-on, since a large thermal load is applied to the electrodes 610 and 710, the protrusions 618 and 718 formed at the distal ends are deformed and blackening occurs.

In a state in which the protrusions are deformed in this way, when the combined driving is continued, the deformation of the protrusions worsens. As a result, normal combined driving cannot be performed.

Therefore, in this embodiment, as shown in FIG. 14, in the warm-up period immediately after the power-on, the high-frequency driving is executed rather than the combined driving. Consequently, the shape change of the electrodes 610 and 710 during the warm-up is suppressed and blackening is prevented. Subsequently, the combined driving is executed in a rated period (the second period) subsequent to the warm-up period to attain both maintenance of an inter-electrode distance and prevention of blackening.

It is preferable to set the frequency of the high-frequency current in the warm-up period immediately after the power-on to be higher than 1 kHz.

Figure 15:
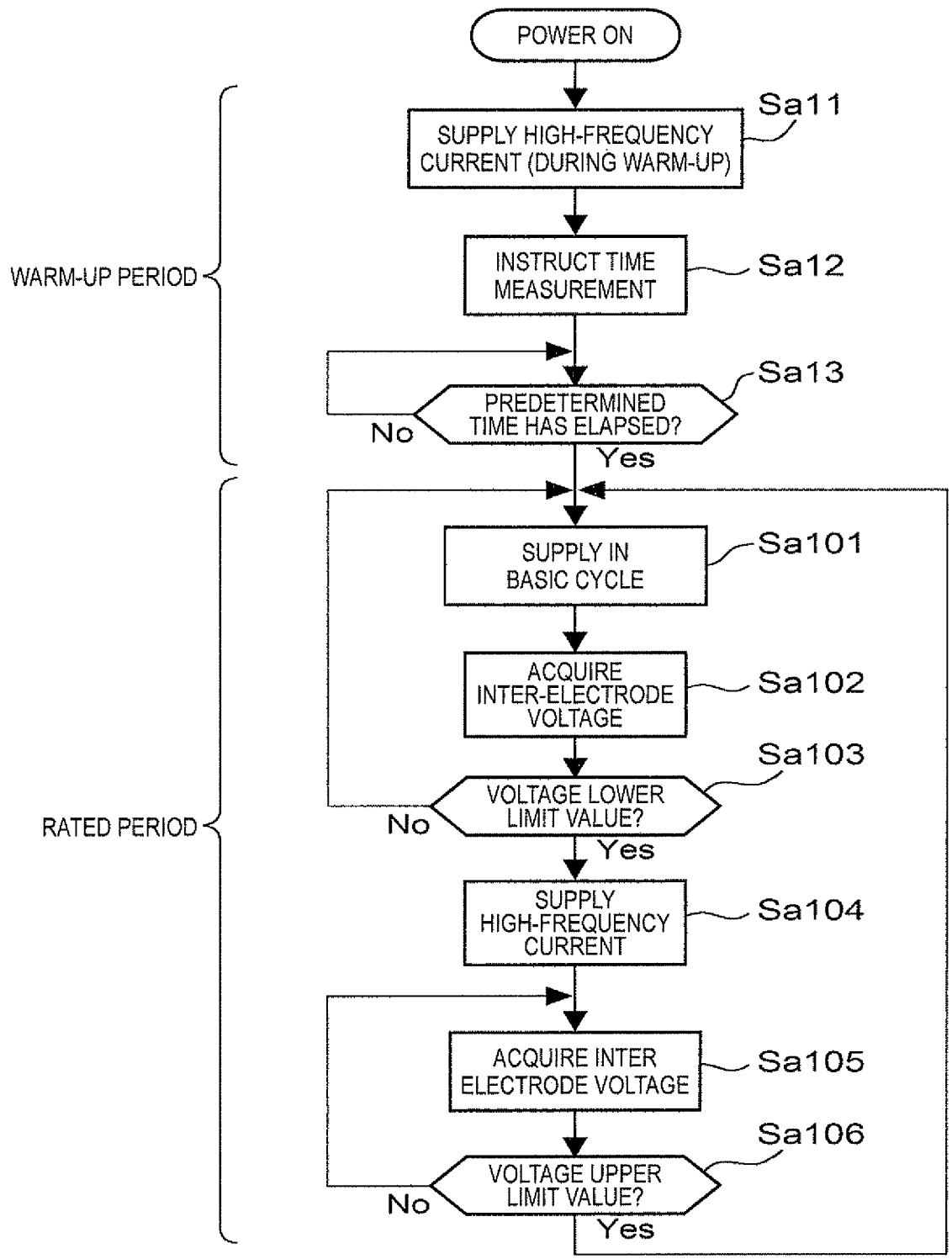
FIG. 15 is a diagram for explaining combined driving in the light source device.

An example of processing contents for realizing the driving method shown in FIG. 14 is explained. FIG. 15 is a flowchart for explaining the processing contents.

When power-on of the light source device 1 is instructed, first, the control unit 33 designates a value equal to or smaller than a value in the rated period as a constant current value for the constant current source 31 and sets a frequency for alternately switching ON and OFF states of the pair of the switches Sw1 and Sw4 and the pair of the switches Sw2 and Sw3 to be equal to or higher than 2 kHz (step Sa11). Consequently, during the warm-up after the power-on, a high-frequency current limited to be equal to or lower than a high-frequency current in the rated period flows to the electrodes 610 and 710 of the discharge lamp 500.

Subsequently, the control unit 33 instructs the time measuring unit 36 to measure time (step Sa12). According to the instruction, the time measuring unit 36 starts measurement of time and supplies the measured time to the control unit 33.

The control unit 33 determines whether predetermined time has elapsed after the measurement is instructed, i.e., the high-frequency current is supplied after the power-on (step Sa13). As the predetermined time, an appropriate value is selected as appropriate in a range of, for example, 1 to 60 minutes.

When the predetermined time has not elapsed (when a determination result in step Sa13 is "No"), the processing procedure is returned to Step Sa13. Therefore, the high-frequency driving in the warm-up period is executed until the predetermined time elapses. On the other hand, when the predetermined time has elapsed, the determination result in step Sa13 is "Yes". The control unit 33 shifts to operation for the combined driving in the rated period.

The combined driving in the rated period is alternate switching of the low-frequency driving and the high-frequency driving. The low-frequency driving is repetition of the basic cycle shown in FIG. 14. The basic cycle is divided into the first section A to the eighth section H.

Therefore, first, the control unit 33 executes operation for supplying the first direct current in positive polarity in the first section A. Specifically, the control unit 33 controls the pair of the switches Sw1 and Sw4 to the ON state and controls the pair of the switches Sw2 and Sw3 to the OFF state throughout the first section A. Consequently, the first direct current is supplied to the discharge lamp 500 in positive polarity directed from the electrode 610 to the electrode 710.

Subsequently, the control unit 33 alternately switches the ON and OFF states of the pair of the switches Sw1 and Sw4 and the pair of the switches Sw2 and Sw3 at a cycle of the first alternating current throughout the second section B. Consequently, the first alternating current is supplied to the discharge lamp 500. Subsequently, the control unit 33 controls the pair of the switches Sw1 and Sw4 to the OFF state and controls the pair of the switch Sw2 and Sw3 to the ON state throughout the third section C. Consequently, the first direct current is supplied to the discharge lamp 500 in negative polarity directed from the electrode 710 to the electrode 610. The control unit 33 alternately switches the pair of the switches Sw1 and Sw4 and the pair of the switches Sw2 and Sw3 at the cycle of the first alternating current throughout the fourth section D. Consequently, the first alternating current is supplied to the discharge lamp 500 again.

Further, the control unit 33 controls the pair of the switches Sw1 and Sw4 to the ON state and controls the pair of the switch Sw2 and Sw3 to the OFF state throughout the fifth section E. Consequently, the second direct current is supplied to the discharge lamp 500 in the positive polarity directed from the electrode 610 to the electrode 710. The control unit 33 alternately switches the pair of the switches Sw1 and Sw4 and the pair of the switches Sw2 and Sw3 at a cycle of the second alternating current throughout the sixth section F. Consequently, the second alternating current is supplied to the discharge lamp 500. Subsequently, the control unit 33 controls the pair of the switches Sw1 and Sw4 to the OFF state and controls the pair of the switch Sw2 and Sw3 to the ON state throughout the seventh section G. Consequently, the second direct current is supplied to the discharge lamp 500 in the negative polarity directed from the electrode 710 to the electrode 610. The control unit 33 alternately switches the pair of the switches Sw1 and Sw4 and the pair of the switches Sw2 and Sw3 at the cycle of the second alternating current throughout the eighth section H. Consequently, the second alternating current is supplied to the discharge lamp 500 again.

When one basic cycle of the low-frequency driving in the combined driving ends, the control unit 33 acquires an inter-electrode voltage measured by the voltmeter 35 (step Sa102) and determines whether the voltage has reached a lower limit value (step Sa103). When the voltage has not reached the lower limit value (when a determination result of step Sa103 is "No"), the processing procedure is returned to step Sa101 and the basic cycle is executed again.

When the low-frequency driving is executed, since the protrusions extend and the inter-electrode distance gradually decreases, the inter-electrode voltage reaches the lower limit value soon.

When the inter-electrode voltage has reached the lower limit value (when the determination result in step Sa103 is "Yes"), the control unit 33 alternately switches the ON and OFF states of the pair of the switches Sw1 and Sw4 and the pair of the switches Sw2 and Sw3 at a cycle of the high-frequency driving in the combined driving (step Sa104). Consequently, an electric current flowing to the electrodes 610 and 710 of the discharge lamp 500 is switched to a high-frequency current.

The control unit 33 acquires an inter-electrode voltage measured by the voltmeter 35 (step Sa105) and determines whether the voltage has reached an upper limit value (step Sa106). When the voltage has not reached the upper limit value (when a determination result in step Sa106 is "No"), the processing procedure is returned to step Sa105. However, when the high-frequency current is supplied to the discharge lamp 500, since the inter-electrode distance increases, the inter-electrode voltage reaches the upper limit value soon. When the inter-electrode voltage has reached the upper limit value (when the determination result in step Sa106 is "Yes"), the processing procedure is returned to step Sa101. Consequently, the discharge lamp 500 is switched from the high-frequency driving to the basic cycle of the low-frequency driving and driven and is driven according to repetition of the basic cycle until the inter-electrode voltage reaches the lower limit value again.

Figure 16:
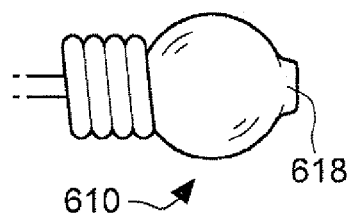
FIG. 16 is a diagram showing a driving method for a discharge lamp according to the fourth embodiment in time-series order.
Figure 17:
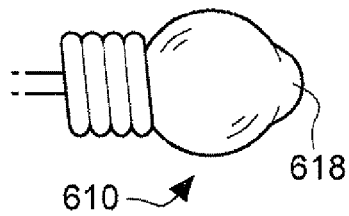
FIG. 17 is a flowchart for explaining a driving method for the discharge lamp.
Figure 18:
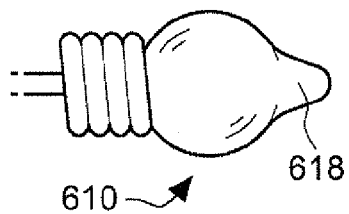
FIG. 18 is a diagram showing deformation or the like of an electrode in the discharge lamp.

In this embodiment, in the low-frequency driving of the combined driving, it is possible to prevent narrowing and disappearance of the protrusions according to the basic cycle of the first section A to the eighth section H. In the high-frequency driving in the combined driving, the protrusion 618 (718) of the electrode 610 (710) is planarized and the inter-electrode distance increases as shown in FIG. 16. However, in the low-frequency driving immediately after the high-frequency driving, as shown in FIG. 17, the protrusion 618 and the peripheral portion of the protrusion 618 melt and the shape thereof is adjusted according to the supply of the first direct current in the beginning of the basic cycle. After the shape is adjusted, the protrusion 618 is pulled as shown in FIG. 18 according to the supply of the first alternating current. Therefore, according to this embodiment, since moderate protrusions are stably formed, it is possible to attain maintenance of the inter-electrode distance and suppression of blackening by the combined driving for a long period.

According to this embodiment, a shape change of the electrodes 610 and 710 is suppressed and blackening is prevented by the high-frequency driving in the warm-up period until the predetermined time elapses immediately after the power-on.

In this embodiment, the combined driving is switched to the low-frequency driving when the inter-electrode voltage reaches the upper limit value and switched to the high-frequency driving when the inter-electrode voltage reaches the lower limit value. However, the low-frequency driving and the high-frequency driving may be alternately switched at an interval of, for example, ten minutes.

The warm-up period is set to the period until the predetermined time elapses after the power-on. However, since the inter-electrode distance increases according to the supply of the high-frequency current, the warm-up period may be a period until the inter-electrode voltage reaches a threshold, for example, the upper limit value.

Fifth Embodiment

A fifth embodiment of the invention is explained. In this embodiment, the light source device 1 in the embodiments explained above is applied to a projector.

Figure 19:
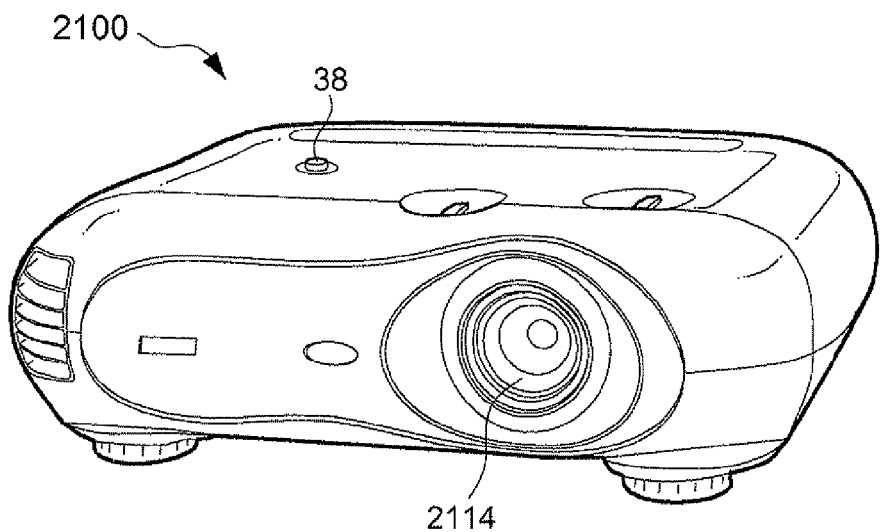
FIG. 19 is a diagram showing a projector including a light source device according to a fifth embodiment.

FIG. 19 is a diagram showing an external configuration of the projector. As shown in the figure, a projector 2100 is a stationary type. A projection lens 2114 for projecting a video is provided on the front surface of the projector 2100. A push-on type switch 38 for instructing activation and interruption of a power supply is provided on the top plate of the projector 2100.

Figure 20:
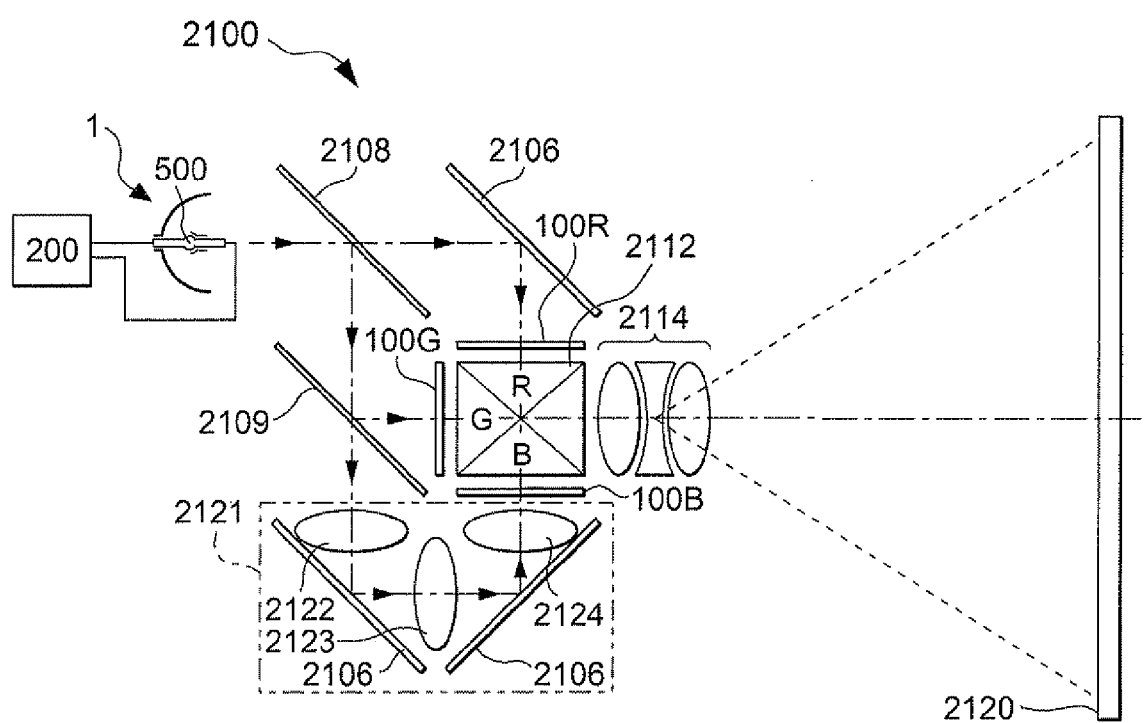
FIG. 20 is a diagram showing an optical configuration of the projector.

FIG. 20 is a plan view showing an example of an optical configuration of the projector 2100.

As shown in the figure, the projector 2100 is a so-called 3CCD type including transmissive liquid crystal light valves 100R, 100G, and 100B.

The light source device 1 is provided inside the projector 2100. An alternating current is supplied from the driving device 200 to the discharge lamp 500 and white light is emitted from the discharge lamp 500 and is emitted in a 3 o'clock direction in the figure by an optical member such as a main reflecting mirror. The emitted white light is separated into the three primary colors of R (red) G (green), and B (blue) by three mirrors 2106 and dichroic mirrors 2108 and 2109 arranged inside. The color lights are respectively made incident on the liquid crystal light valves 100R, 100G, and 100B respectively corresponding to the primary colors. Specifically, the dichroic mirror 2108 transmits light in a wavelength region of R in the white light made incident from a 9 o'clock direction in the figure and reflects the remaining lights in wavelength regions of G and B in a 6 o'clock direction. The dichroic mirror 2019 transmits the light in the wavelength region of B in the lights in the wavelength regions of G and B made incident from a 12 o'clock direction and reflects the other light in the wavelength region of G in the 3 o'clock direction. The B light has a long optical path compared with the R and G lights. Therefore, in order to prevent a loss of the B light, the B light is guided via a relay lens system 2121 including an incident lens 2122, a relay lens 2123, and an emission lens 2124.

Video signals corresponding to the respective colors of R, G, and B are supplied to the projector 2100 respectively from not-shown host circuits. The liquid crystal light valves 100R, 100G, and 100E are respectively driven by the video signals respectively corresponding to R, G, and B. Consequently, the lights made incident on the liquid crystal light valves 100R, 100G, and 100B are emitted with transmittances of the lights modulated for each of pixels.

The lights respectively modulated by the liquid crystal light valves 100R, 100G, and 100E are made incident on a dichroic prism 2112 from three directions. In the dichroic prism 2112, the R and B lights are refracted at 90 degrees and the G light travels straight. Therefore, after the modulated lights of the respective colors are combined, a color image is projected on a screen 2120 by the projection lens 2114.

Lights respectively corresponding to R, G, and B are made incident on the liquid crystal light valves 100R, 100G, and 100B by the dichroic mirror 2108. Therefore, a color filer provided in a projector of a direct view type is not provided. Images transmitted through the liquid crystal light valves 100R and 100B are projected after being reflected by the dichroic prism 2112. On the other hand, an image transmitted through the liquid crystal light valve 100G is directly projected. Therefore, a horizontal scanning direction by the liquid crystal light valves 100R and 100B is opposite to a horizontal scanning direction by the liquid crystal light valve 100G. A horizontally inverted image is created.

The entire disclosure of Japanese Patent Application No. 2012-198164, filed Sep. 10, 2012 and Japanese Patent Application No. 2012-198165, filed Sep. 10, 2012 and Japanese Patent Application No. 2012-195838, filed Sep. 6, 2012 are expressly incorporated by reference herein.

What is claimed is:

1. A driving device that drives a discharge lamp including a first electrode and a second electrode, the driving device comprising:
   a current supplying unit configured to supply an alternating current having a frequency higher than 1 kHz to between the first electrode and the second electrode in a high-frequency period in a lighting period of the discharge lamp that is after a warm-up period and during a rated state of operation, wherein
   the current supplying unit repeats the high-frequency period including a period in which a first high-frequency alternating current having a first frequency between 4 kHz-5 kHz is supplied and a period in which a second high-frequency alternating current having a second frequency between 3 kHz-4 kHz is supplied.

2. The driving device according to claim 1, wherein the current supplying unit supplies a current alternately including the high-frequency period and a low-frequency period in which an alternating current having a frequency equal to or lower than 1 kHz is supplied to between the first electrode and the second electrode.

3. The driving device according to claim 2, further comprising:
   a voltage-value measuring unit configured to measure a voltage value applied between the first electrode and the second electrode, wherein
   the current supplying unit switches, when the voltage value detected in the high-frequency period exceeds a predetermined first threshold, from the high-frequency period to the low-frequency period and switches, when the voltage value detected in the low-frequency period exceeds a predetermined second threshold, from the low-frequency period to the high-frequency period.

4. The driving device according to claim 1, wherein the current supplying unit supplies a square wave alternating current having a rectangular waveform as the first high-frequency alternating current and the second high-frequency alternating current.

5. The driving device according to claim 1, wherein the current supplying unit sets at least one of the first high-frequency alternating current and the second high-frequency alternating current to a direct current supplied at a length of a half cycle of itself.

6. A light source device comprising:
   the driving device according to claim 1; and
   the discharge lamp.

7. A projector comprising:
   the light source device according to claim 6;
   a modulating device configured to modulate, based on image information, light emitted from the discharge lamp; and
   a projecting device configured to project the light modulated by the modulating device.

8. A driving device that drives a discharge lamp including a first electrode and a second electrode, the driving device comprising:
a current supplying unit configured to supply current to between the first electrode and the second electrode, wherein
the current supplying unit supplies the current alternately including a high-frequency period in which an alternating current having a frequency higher than 1 kHz is supplied to between the first electrode and the second electrode and a low-frequency period in which an alternating current having a frequency equal to or lower than 1 kHz is supplied to between the first and second electrodes,
the low frequency period includes first to eighth sections, the current supplying unit supplies:
in the first section, a first direct current in one of positive polarity and negative polarity
in the second section, a first low-frequency alternating current having a first frequency,
in the third section, the first direct current in the other of the positive polarity and the negative polarity,
in the fourth section, the first low-frequency alternating current,
in the fifth section, a second direct current different from the first direct current in one of the positive polarity and the negative polarity,
in the sixth section, a second low-frequency alternating current having a second frequency different than the first frequency,
in the seventh section, the second direct current in the other of the positive polarity and the negative polarity, and
in the eight section, the second low-frequency alternating current.

9. The driving device according to claim 8, wherein the current supplying unit sets length of each of the second section and the fourth section to be integer times as large as a cycle of the first low-frequency alternating current and sets length of each of the sixth section and the eighth section to be integer times as large as a cycle of the second low-frequency alternating current.

10. The driving device according to claim 8, wherein the current supplying unit sets length of each of the second section, the fourth section, the sixth section, and the eighth section to be equal to or larger than 1 millisecond and smaller than 1 second.

11. The driving device according to claim 8, wherein the current supplying unit sets length of the first section and length of third section the same and sets length of the fifth section and length of the seventh section the same.

12. The driving device according to claim 8, wherein the current supplying unit sets length of each of the first section, the third section, the fifth section, and the seventh section to be equal to or larger than 1 millisecond and smaller than 100 milliseconds.

13. The driving device according to claim 8, wherein the current supplying unit sets a length of a section in which an alternating current having a lower frequency of the first low-frequency alternating current and the second low-frequency alternating current is supplied to be longer than a length of a section in which an alternating current having a higher frequency of the first low-frequency alternating current and the second low-frequency alternating current is supplied.

14. The driving device according to claim 8, wherein the current supplying unit supplies, in a warm-up period of the discharge lamp before the high-frequency period and the low-frequency period, an alternating current having a frequency higher than 1 kHz to between the first electrode and the second electrode.

15. The driving device according to claim 8, wherein the high-frequency period includes a period in which a first high-frequency alternating current having a third frequency higher than 1 kHz is supplied to between the first electrode and the second electrode and a period in which a second high-frequency alternating current having a fourth frequency higher than 1 kHz and different from the third frequency is supplied to between the first electrode and the second electrode.

16. A driving method for a discharge lamp including a first electrode and a second electrode, the driving method comprising:
supplying an alternating current having a frequency higher than 1 kHz to between the first electrode and the second electrode in a high-frequency period in a lighting period of the discharge that is after a warm-up period and during a rated state of operation; and
repeating the high-frequency period including a period in which a first high-frequency alternating current having a first frequency between 4 kHz-5 kHz is supplied and a period in which a second high-frequency alternating current having a second frequency between 3 kHz-4 kHz is supplied.

17. The driving method for the discharge lamp according to claim 16, further comprising:
supplying a first high-frequency alternating current having a third frequency higher than 1 kHz and a second high-frequency alternating current having a fourth frequency higher than 1 kHz and different from the third frequency to between the first electrode and the second electrode in the high-frequency period.

18. A driving method for a discharge lamp including a first electrode and a second electrode, the driving method comprising:
supplying current alternately including a high-frequency period in which an alternating current having a frequency higher than 1 kHz is supplied to between the first electrode and the second electrode and a low-frequency period in which an alternating current having a frequency equal to or lower than 1 kHz is supplied to between the first electrode and the second electrode, the low-frequency period including first to eighth sections;
supplying, in the first section, a first direct current in one of positive polarity and negative polarity;
supplying, in the second section, a first low-frequency alternating current having a first frequency;
supplying, in the third section, the first direct current in the other of the positive polarity and the negative polarity;
supplying, in the fourth section, the first low-frequency alternating current;
supplying, in the fifth section, a second direct current different from the first direct current in one of the positive polarity and the negative polarity;
supplying, in the sixth section, a second low-frequency alternating current having a second frequency different from the first frequency;
supplying, in the seventh section, the second direct current in the other of the positive polarity and the negative polarity; and
supplying, in the eighth section, the second low-frequency alternating current.

* * * * *